United States Patent
Piya et al.

(10) Patent No.: US 10,515,479 B2
(45) Date of Patent: Dec. 24, 2019

(54) COLLABORATIVE 3D MODELING SYSTEM

(71) Applicant: Purdue Research Foundation, West Lafayette, IN (US)

(72) Inventors: Cecil Piya, West Lafayette, IN (US); Vinayak Raman Krishnamurthy, West Lafayette, IN (US); Karthik Ramani, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 15/821,831

(22) Filed: Nov. 23, 2017

(65) Prior Publication Data

US 2018/0122138 A1 May 3, 2018

Related U.S. Application Data

(63) Continuation-in-part of application No. 15/801,320, filed on Nov. 1, 2017, now abandoned.

(60) Provisional application No. 62/426,011, filed on Nov. 23, 2016, provisional application No. 62/416,114, filed on Nov. 1, 2016.

(51) Int. Cl.
*G06T 15/00* (2011.01)
*G06T 17/10* (2006.01)
*G06F 3/0488* (2013.01)
*G06F 17/50* (2006.01)

(52) U.S. Cl.
CPC ............ *G06T 17/10* (2013.01); *G06F 3/0488* (2013.01); *G06F 17/50* (2013.01); *G06T 2200/08* (2013.01)

(58) Field of Classification Search
CPC ......... G06T 19/00; G06T 17/20; G06T 17/00; G06T 15/10; G06T 15/00
USPC ....................................................... 345/419
See application file for complete search history.

(56) References Cited

U.S. PATENT DOCUMENTS

| 8,243,064 B1 | 8/2012 | Moravanszky | |
| 8,745,521 B2* | 6/2014 | Colin Armitage | G06F 8/38 715/780 |
| 2005/0017969 A1 | 1/2005 | Sen | |
| 2009/0284550 A1 | 11/2009 | Shimada | |
| 2011/0175916 A1 | 7/2011 | Noris | |
| 2015/0286295 A1* | 10/2015 | Pepe | G06F 3/0362 345/163 |
| 2016/0225175 A1* | 8/2016 | Kim | H04B 1/3833 |

(Continued)

OTHER PUBLICATIONS

Rivers, A., "3D Modeling with Silhouettes", ACM Transactions on Graphics, vol. 29, No. 4, Article 109, Jul. 2010, pp. 8.

(Continued)

*Primary Examiner* — Gordon G Liu
(74) *Attorney, Agent, or Firm* — Purdue Research Foundation

(57) ABSTRACT

A collaborative 3D modeling system, comprising a computer processing unit, a digital memory, and an electronic display, the computer processing unit and the digital memory configured to provide 3D model representations of a first plurality of versions of an object component for a first user, the versions being selectable along a first axis, and using the electronic display, provide a plurality of user identifications which are selectable along a second axis, wherein selecting a subsequent user causes a second plurality of said versions of said object component to be displayed on the electronic display.

6 Claims, 27 Drawing Sheets

(56) References Cited

U.S. PATENT DOCUMENTS

2017/0103584 A1* 4/2017 Vats ........................ G06T 19/20

OTHER PUBLICATIONS

Schmidt, R., "ShapeShop: Sketch-Based Solid Modeling with BlobTrees", Eurographics Workshop on Sketch Based Interfaces and Modeling, 2005, pp. 10.

Chew, L., "Constrained Delaunay Triangulations", Algorithmica, 1989, 4, pp. 97-108.

* cited by examiner

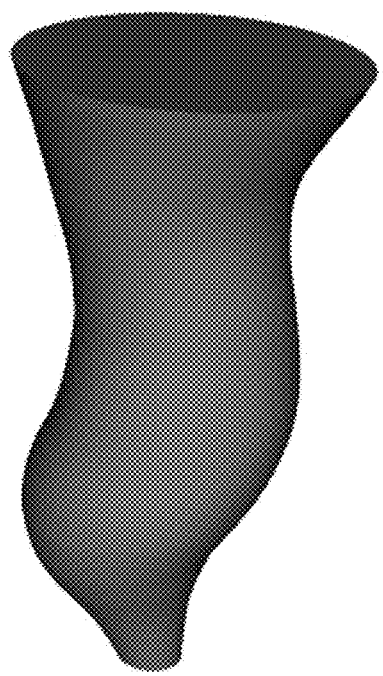
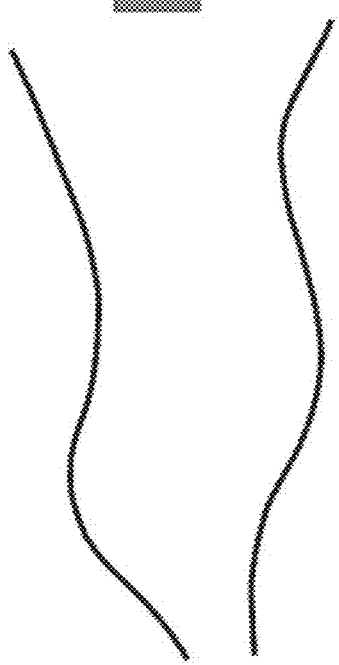
(b) Tubular Shape
(a) Rail Curves
FIG. 6

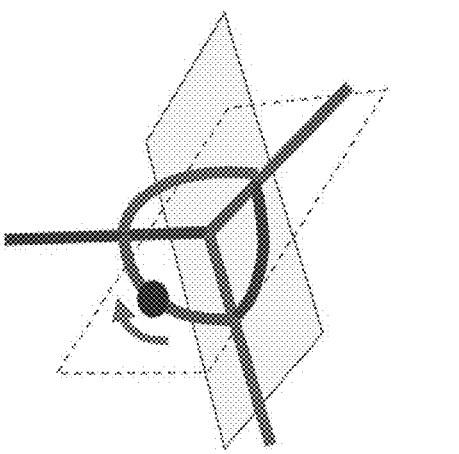
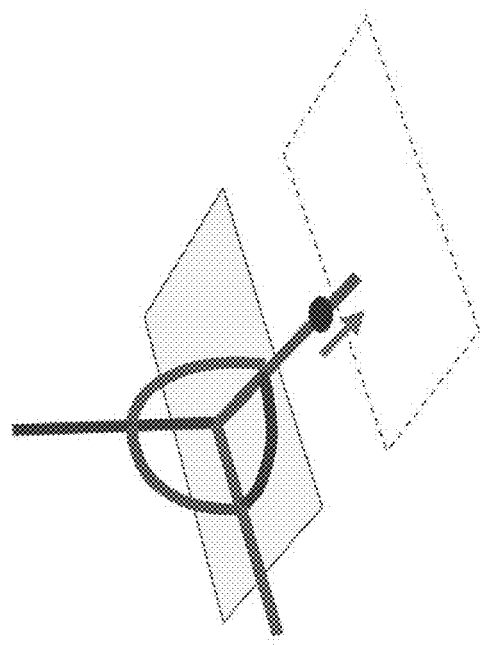
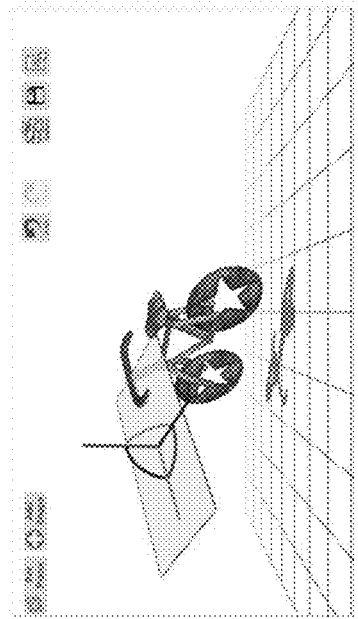
(a) 3D Manipulation Widget on Sketch Plane
(b) Translation of Plane
(c) Rotation of Plane
FIG. 8

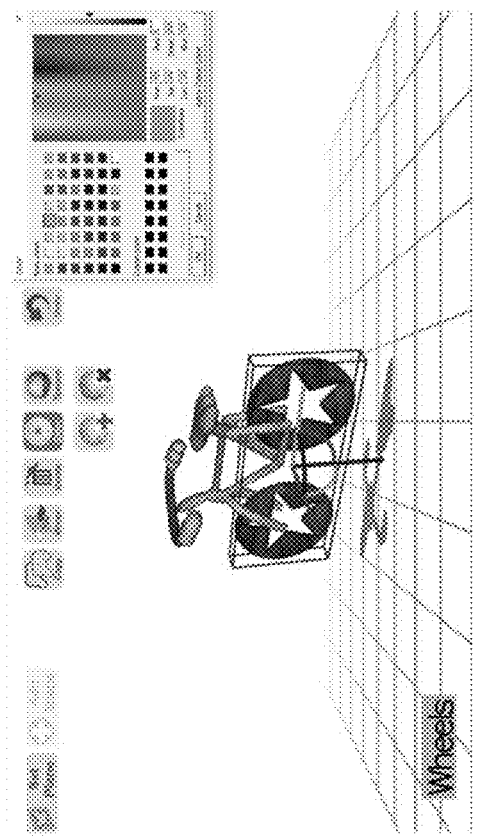
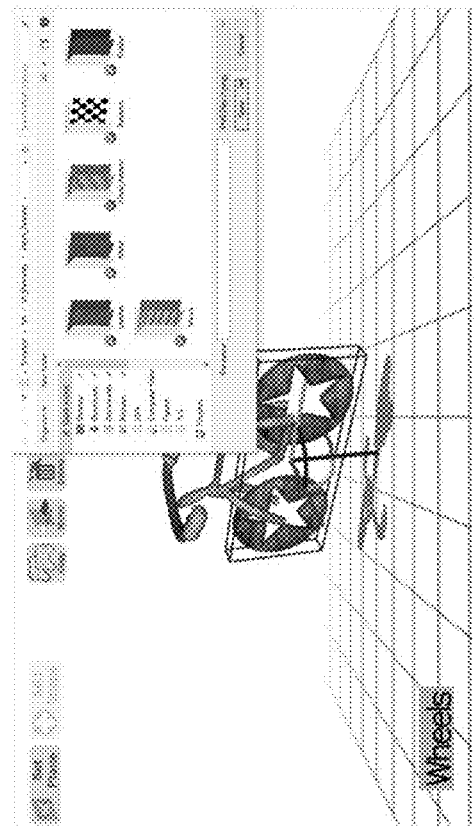
FIG. 13

(a) Blobby Shape File

```
Primitive
<Round,Cone,Taper,Flat>
Plane
x,y,z           // Center
px,py,pz   // Primary Axis
nx,ny,nz   // Normal
Resolution
<Mesh Sampling Resolution>
Inflation
<Inflation value>
Boundary
x1,y1,z1
x2,y2,z2
x3,y3,z3
.
.
.
Hole
x1,y1,z1
x2,y2,z2
x3,y3,z3
.
.
.
Hole
x1,y1,z1
x2,y2,z2
x3,y3,z3
.
.
.
```

(b) Tubular Shape File

```
Primitive
<Sweep>
Plane
x,y,z           // Center
px,py,pz   // Primary Axis
nx,ny,nz   // Normal
Resolution
<Section Resolution>
primitive
Curve       // Railing 1
x1,y1,z1
x2,y2,z2
x3,y3,z3
.
.
.
Curve       // Railing 2
x1,y1,z1
x2,y2,z2
x3,y3,z3
.
.
.
```

*FIG. 17*

COLLABORATIVE 3D MODELING SYSTEM

CROSS REFERENCE TO RELATED APPLICATIONS

The present U.S. patent application is related to and claims the priority benefit of U.S. Provisional Patent Application Ser. No. 62/426,011, filed Nov. 23, 2016. The present U.S. patent application is also related to and is a continuation-in-part of U.S. patent application Ser. No. 15/801,320, filed Nov. 1, 2017, which claims the priority benefit of U.S. Provisional Patent Application Ser. No. 62/416,114, filed Nov. 1, 2016. The contents of all of the above applications are hereby incorporated by reference in their entirety into the present disclosure.

TECHNICAL FIELD

The present application relates to computer aided-design systems, and more specifically, to a collaborative 3D computer modeling system.

BACKGROUND

Early-stage design is an essential part of the design process, as it allows designers to conceive and explore preliminary ideas while informing downstream processes. Its goal is not to generate full-fledged designs, but rather to aid visual observation and communication of coarse mental images. Current design practices primarily utilize sketching and 3D modeling for early-stage ideation. While sketching is an efficient means for expressing ideas, it is limited to a single viewpoint and also requires good drawing skills. Existing CAD tools on the other hand were developed in the computer as a tool paradigm, where it serves as a passive vessel for design. These methods failed to fully leverage the computer-as-a-partner approach where the digital medium is treated as an active participant in a creative design process. As a result, traditional CAD tools primarily serve final-stage detailed design processes, where expert-level design and tool operation skills are required. They are not conducive towards quick capturing and recording of fleeting ideas and rapid exploration of the design space, both of which are necessary to ensure a high quality end product and reduce design time and cost in downstream processes. Therefore, improvements are needed in the field.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 6 depicts generation of a tubular shape from a pair of rail curves according to one embodiment.

FIG. 8 depicts 3D manipulation of an object using a manipulation widget according to one embodiment.

FIG. 13 depicts color and texture application to a shape or a part within a design model according to one embodiment.

FIG. 17 depicts data storage file formats for storing shape information for blobby shapes and tubular shapes according to one embodiment.

The attached drawings are for purposes of illustration and are not necessarily to scale.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

The present disclosure provides a set of frameworks, process and methods aimed at enabling the expression, manipulation, and exploration of 3D free-form shapes and designs enabled through sketch based modeling interactions on both desktop and mobile interfaces. In an example embodiment, the present disclosure provides sketch-based techniques for generating 3D shapes from simple sketch inputs provided by the user. Herein, a set of interactive techniques use for both creating the shapes, modifying their geometry, adding aesthetic or material properties, and manipulating them in three dimensional space is provided. In the second embodiment, an interactive mechanism for constructing shapes in context of an overall design structure is provided. The present disclosure also provides various visual means to support such in-situ shape creation, and design modeling directly in 3D space. Finally, an embodiment where the design model can be hierarchically represented as a collection of individual shapes, assembly of functional parts, or a holistic concept, embodying a full design idea within the the design space is provided.

The system 1800 disclosed herein (FIG. 18) is an early-stage design ideation tool that enables both 3D content creation, particularly during the early-stage design processes where quick design ideation and rapid design space exploration are imperative. To support flexibility and intuitive modeling interactions, the system 1800 is preferably used on a digital tablet supporting both pen-based sketching and multi-touch gestures. However, it is also compatible within ordinary PCs, where a mouse and keyboard inputs are used for modeling interactions. The interface was implemented using an OpenGL based platform and was written in C++. It is compatible with a wide variety of desktop based PCs and commercial digital tablets.

Figure 1:
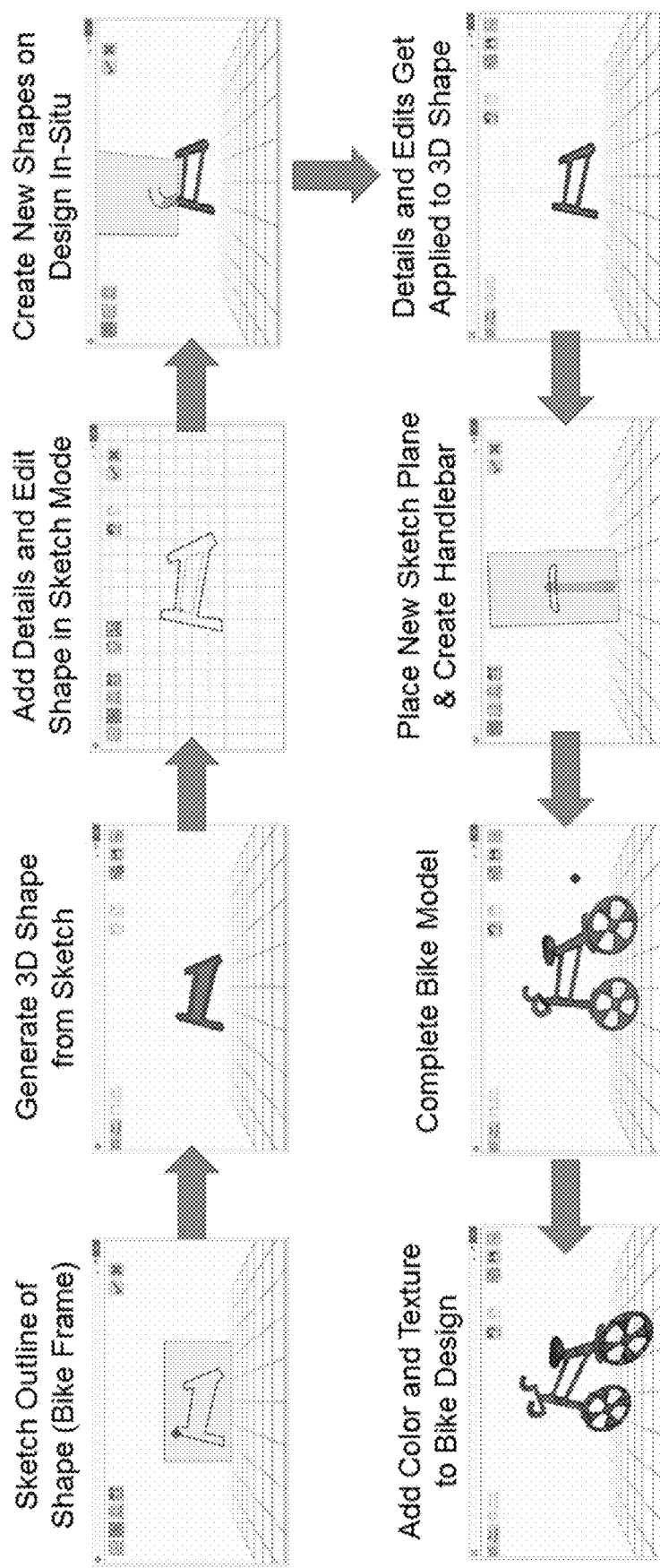
FIG. 1 depicts an overview of a 3D design modeling process according to one embodiment.
Figure 2:
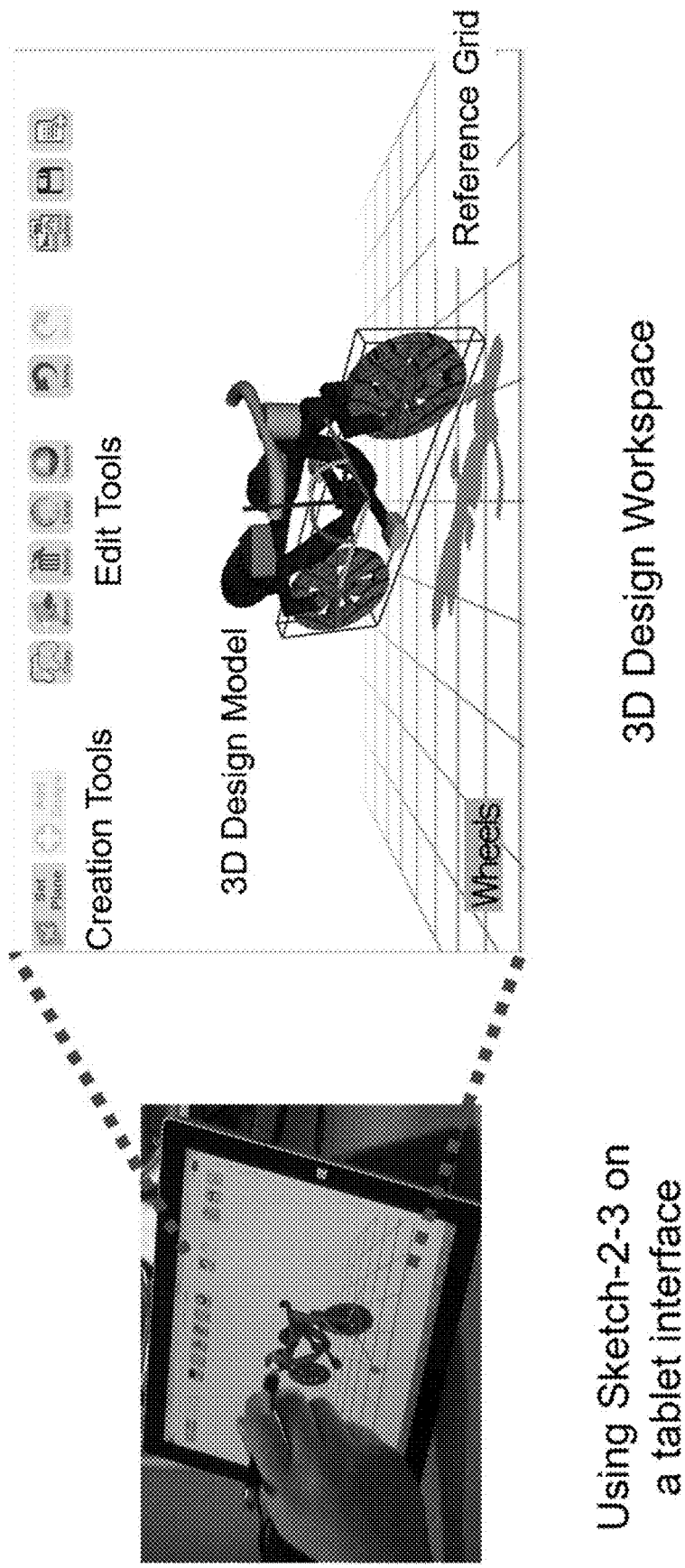
FIG. 2 depicts a user interface for the process of FIG. 1 according to one embodiment.

The 3D design workspace (as shown in FIG. 1 and FIG. 2) serves as and visual medium for creating new designs and interacting with design ideas and concepts. A complete design can be modeled within this workspace alone, as it prevents shifting a user's focus across different views, and also allows creation of new shapes in context of the design. There are several advantages to this workspace. First, when creating new shapes within a design, users can directly create them over their adjoining neighbors. This allows them to interactively model the shape such that it not only conforms to its environment, but also has a size and structure proportional to the rest of the design. It gives users a direct means to compare their mental idea with respect to the visually observable design, while also allowing for real-time and interactive manipulation/modification of the shape based on how the user perceives its in-context appearance.

This workspace is a highly interactive space. This space is receptive to a wide variety of 2D inputs ranging from multi-touch gestures on tablets and mobile devices, digital pen-tip contacts, mouse clicks, and keyboard commands. The system automatically recognizes direct contact inputs within the workspace, and uses ray-casting to determine what 3D element or region the user is trying to access within the space. This space is displayed using a perspective view, to aid depth perception of the 3D elements, and shadows are rendered to assist users perceive relative positioning between different elements.

To simplify user interactions and ensure quick expression of ideas, the system 1800 allows users to create 3D shapes from simple 2D sketch inputs. These inputs are directly drawn on a sketch plane using the pen or the mouse. When first starting out with blank workspace, this sketch plane first appears at a central workspace location. For subsequents shapes however, the plane can be interactively placed at a user defined location on the design. The plane can also be freely moved around using a 3D manipulation widget. Details of plane placement and manipulation will be discussed later.

Essentially, during the design modeling process, the user simply defines the cross-sectional silhouette of the shape he wants. The computer automatically fills in the region between the silhouette boundary with a 3D mesh such that the mesh approximates the geometry of the shape intended by the user. Users can define the silhouettes in two ways. First they can draw a single stroke 2D curve geometry or create a polyline curve by defining the individual vertices of the curve. Additionally, users can also create symmetric curves, by first defining a line of symmetry on the sketch plane and drawing the curve on one side of this line. The drawn curve is automatically mirrored onto the other side during the curve drawing process itself. While a freeform sketch is being drawn the sampled points are subjected to a single exponential smoothing process to ensure smoothness in the resulting curve. The raw sketch data (from both curve types) is also uniformly resampled to ensure smoothness in resulting shapes and to avoid geometric artifacts.

Figure 3:
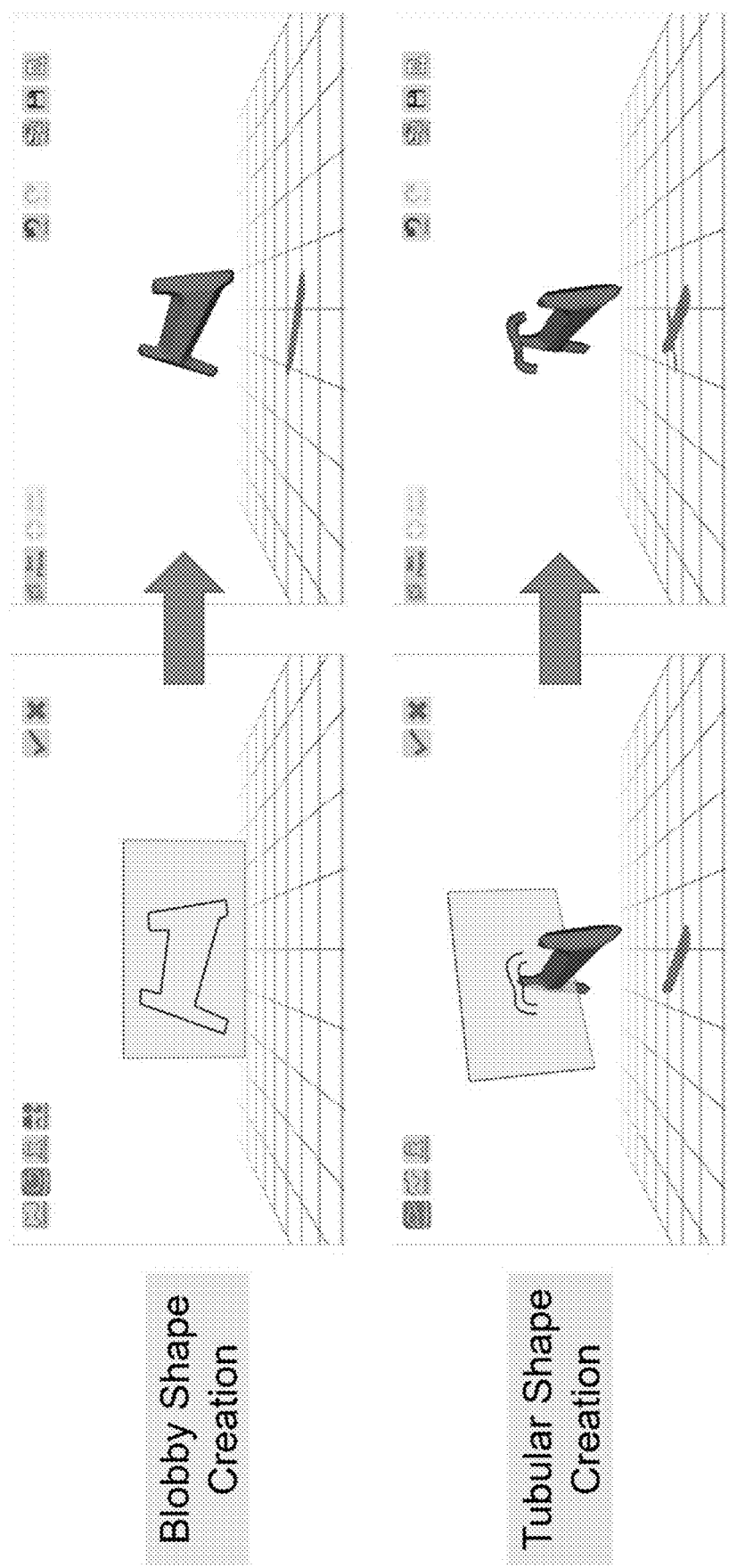
FIG. 3 depicts a modes of shape creating using the process of FIG. 1 for blobby and tubular shape creating according to one embodiment.

There are two types of 3D shapes that can be created using the system 1800. These are blobby shapes and tubular shapes, as shown in FIG. 3. Based on existing literature, these type shape types are capable of supporting a wide variety of 3D forms, and are particularly useful for 3D modeling purposes. They are also highly suitable for early stage design given their support for efficient shape creation and design modeling.

Figure 4:
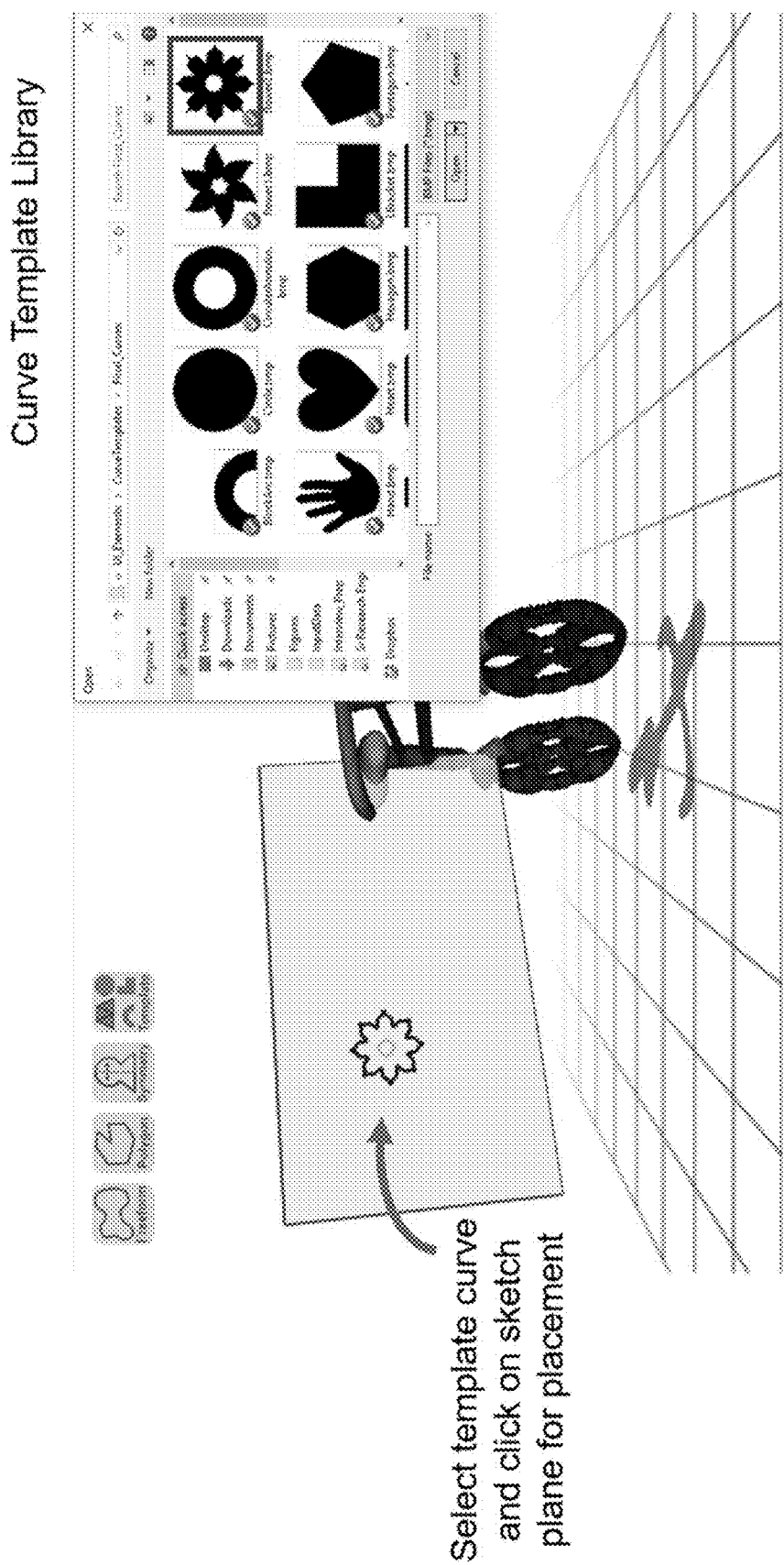
FIG. 4 depicts a template library for importing profile curves according to one embodiment.

Blobby Shapes are created by first drawing a closed "profile curve" on the sketch plane (FIGS. 3 and 4). The curve can either be a single stroke free form curve or a polygon. This curve represents the medial cross sectional silhouette of the intended shape. To allow users to create precise profiles, e.g. circles, regular polygons, patterned designs etc., we provide a set of predefined template curves. For this, users can simply click on the template button in the shape creation menu, and access a wide range of templates from a dialog box. Additionally, users can choose to draw symmetric profile curves using the symmetry option.

Figure 5:
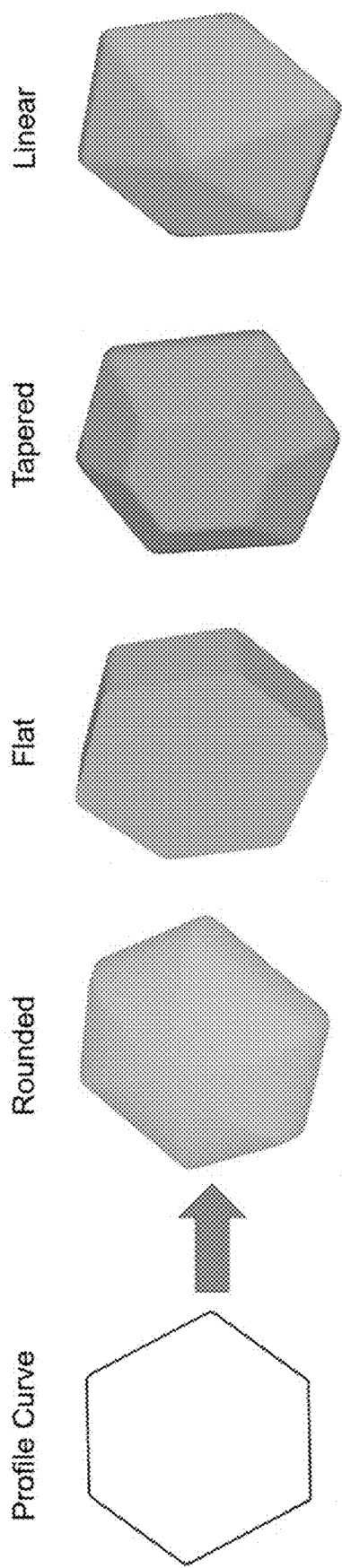
FIG. 5 depicts four different profile curves for creating a blobby shape from a closed profile curve according to one embodiment.

After a profile curve has been defined, the system automatically fills in the interior of the curve with a 3D mesh in order to generate the shape (FIG. 5). This process involves the following steps: (a) The inner 2D region within the profile boundary is populated with a set of interior vertices. For this a 2D grid with a predefined resolution is placed over the profile curve. The grid points lying within the profile are then used as the interior vertices. By using the grid we ensure that the interior vertices are uniformly sampled. (b) A constrained delaunay triangulation algorithm to applied on the boundary and interior vertices to generate a 2D mesh within the profile curve. (c) The interior vertices are then displaced in a direction normal to the profile curve plane. This displacement is based on a pre-defined inflation function.

The system 1800 provides users with the options to select four different kinds of inflation functions. The functions are colloquially defined as circular, tapered, linear, and flat functions. Using iconic representations, we present these functions as four different modes of blobby shape creations within the front-end user interface. However, in the back end shape computational system, these functions are mathematically represented and used for displacing the interior vertices.

Tubular shapes, sweeps, or generalized cylinders serve as highly versatile shape representations for modeling a wide variety of 3D forms. Such shapes have been shown to allow sufficient complexity and diversity within designs, and can be constructed using simple 2D sketch inputs. Tubular Shapes are defined using two open "rail curves". Similar to profile curves, these also represent a mid-sectional silhouette of tubular shapes. They are drawn as separate curves, however the system automatically recognized when the user intends to start and terminate drawing of a given rail curve. We can use both freeform or polyline sketch inputs to draw rail curves. Moreover, the symmetry tool can be used to simultaneously draw the two rail curves as mirrored opposites of one another. This results in a symmetric tubular shape, similar to a revolved extrusion in CAD.

Here, a sweep geometry with a circular cross section is fitted between the two rail curves (FIG. 6). This process comprises of the following steps: (a) Each rail curve is resampled such that their points are equally spaced, and have a constant predefined number of vertices. This way a direct correspondence can be created between two vertices between the two rail curves. (b) Using this correspondence, a medial trajectory curve is then computed between the rail curves. This trajectory also has the same number of vertices as the rail curves. (c) Circular cross sections, represented by a predefined number of equally spaced vertices, are then defined between each pair of vertices between the rail curves, such that the plane of the cross section passes through a trajectory point, and the radius of the cross section is half the distance between the corresponding rail curves. (d) A 3D triangular strip is then drawn between consecutive circular cross sections. Each vertex on the cross section serves as a vertex for creating the triangular strip. The triangular strips between all cross sections collectively form the 3D tubular shape. (d) The start and end cross sections are meshed using constrained delaunay triangulation such that the tube is a closed 3D volume.

The sketch plane is a very fundamental element within the 3D design workspace, as it is used to scaffold all shape creation process. In the previous sections, we described how to create a shape on the sketch plane, but the ability to spatially define the plane within the workspace is also an essential part of system 1800, as it directly supports in context creation of shapes over a design under progress.

Figure 7:
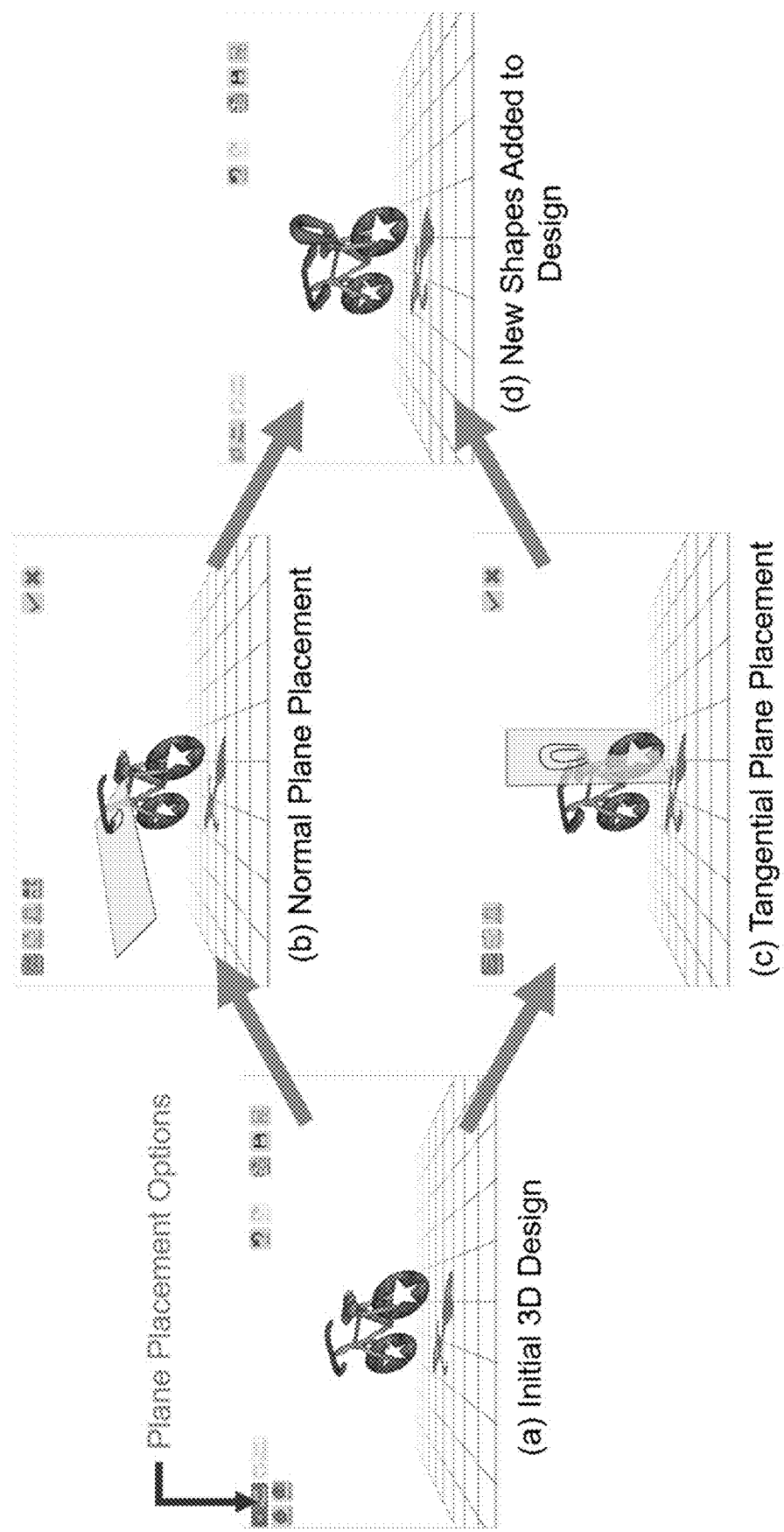
FIG. 7 depicts creation of new shapes in-context of an existing design according to one embodiment.

As described above, the default location of the sketch plane for the first shape is at the center of the workspace. However, for ensuing shapes, users can choose to either place the plane normal or tangential to a given shape on the under-progress design. For this, users simply need to select the placement option, and click over the desired placement location. In addition to obtaining the tangent or orthogonal direction, the back end system also automatically detects the direction of the major axis of the plane (longer edge), such that the plane orientation is consistent with the most convenient direction to draw curves (FIG. 7).

Figure 9:
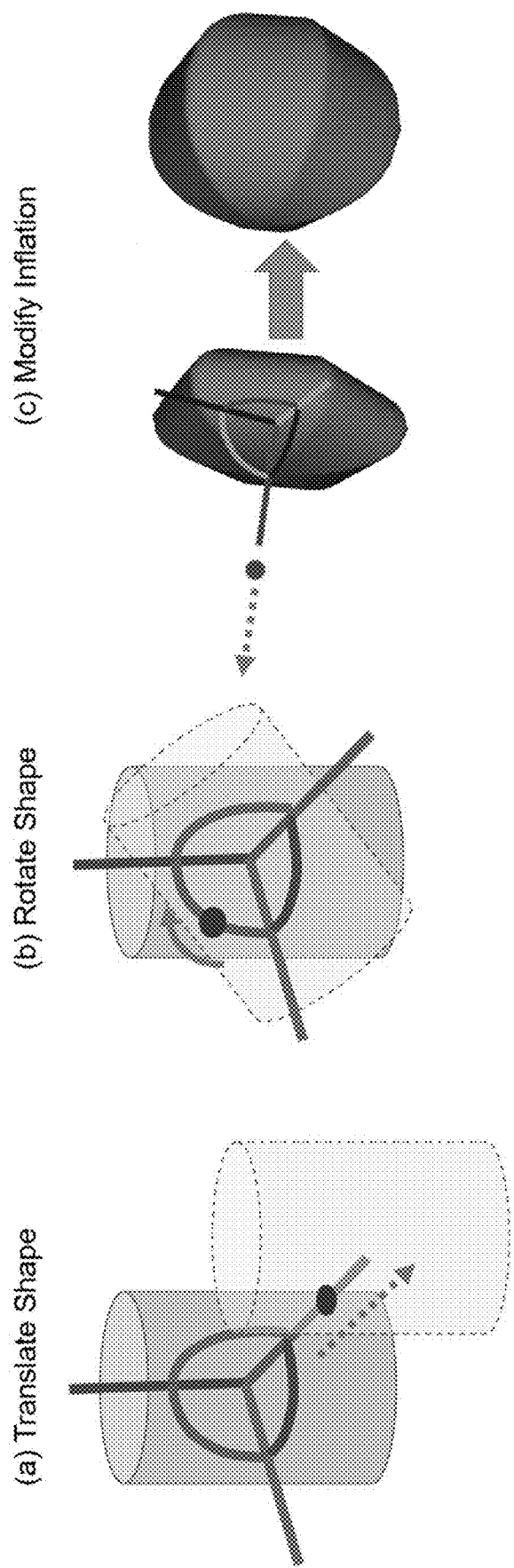
FIG. 9 depicts shape manipulation of an object using the manipulation widget of FIG. 8 according to one embodiment.

The aforementioned placement however is only an initial placement, i.e. users can further refine it using a 3D manipulation widget (FIGS. 8 and 9). Whenever a plane is initially defined in the workspace, it is automatically associated with a 3D manipulation widget, comprising of three axes and arcs between the axes. Click and dragging the axes lines causes the plane to translate in that direction, while doing the same on the arcs causes the plane to rotate along the arc. Thus, users can apply a sequence of such transformations to refine or alter the placement of the sketch plane.

The profile or rail curves for the two shapes types in system 1800 can be drawn directly on the sketch planes. It does not matter what the orientation of the plane is while drawing the curves. User can rotate the design model and/or the plane to any convenient drawing orientation. Users can also manipulate the view of the 3D workspace in the middle of the drawing process to be able to see the sketched curves from different perspectives and scales. When defining a shape in context of an under-progress design, all the curves on the sketch plane are rendered in front of all the other geometries. This way users can observe exactly how their intended shape will look like at its location within the design, and also not have to worry about occlusions when defining the shape.

Very frequently during design prototyping, the initial placement of a shape in the design need to be changed either to refine the shape's placement, test different configurations, or include another shape within the vicinity. In fact, for an early stage conceptualization process being able to quickly alter the placement of shapes leads to rapid exploration of different product forms and navigation of the design space. To support such modeling and design exploration capabilities, system 1800 allows for interactive 3D manipulation of the individual shapes in a quick and efficient manner.

Just as with the manipulation of the sketch plane, the individual shapes in the design can also be manipulated using a 3D manipulation widget (FIG. 9). When a shape is selected with a single click or tap gesture, the widget is automatically placed over the shape such that its origin is at the shape's centroid and the axes are aligned with the principle direction of the shape. Once again, dragging the axes or arcs of the widget causes that shape to transform along that direction.

In addition to spatially moving the shapes around, users can also alter the scale of the shape. This can be done by simply applying a pinch gesture on the tablet, or a SHIFT+drag gesture on the desktop interface. The back end system uses a predefined scaling factor to uniformly scale the shape. The sign of scaling (increase or decrease) is based on the motion of the dragging operation. An outward pinch or a mouse motion towards the shape indicates increased scaling, while the opposite motion indicates a decreased scaling. For blobby shapes, the inflation magnitude can also be altered. For this the widget comprises of an inflation scaling handle which can be dragged along the direction of inflation magnitude change.

At any point during the design modeling activity, the entire design model can also be rotated about its center (using an arcball rotation gesture), translated along a z-parallel plane (using a two finger drag gesture or CTRL+mouse drag on desktop), or scaled (using a two finger pinch gesture or ALT+mouse drag on desktop). These operations allow users to quickly adjust the viewing perspective and scale of the design model during new shape creation or general inspection processes.

The in context shape creation process in the 3D workspace is primarily intended to define the general outline of how a given shape should look like. In addition to that, users have the capability to further refine the shape, modify its geometry at a finer level of detail, and include features that couldn't be applied during shape creation at a global context. For this, the system 1800 interface provides a shape editing mode. The edit mode can be invoked by by selecting a shape with a double tap gesture. Here, the workspace switches to a 2D sketch canvas with the shape's profile or rail curves displayed in a front facing view. By using a separate 2D view, we can provide a larger display of the profile curves, making them amenable to the operations that require finer level of control and precision than what is possible in the 3D workspace. The 2D canvas during edit mode is provided with a regular grid to assist precise placement of sketch inputs, and in the case of polyline inputs, automatic snapping to the grid points. The following operations can be performed during the edit mode.

Figure 10:
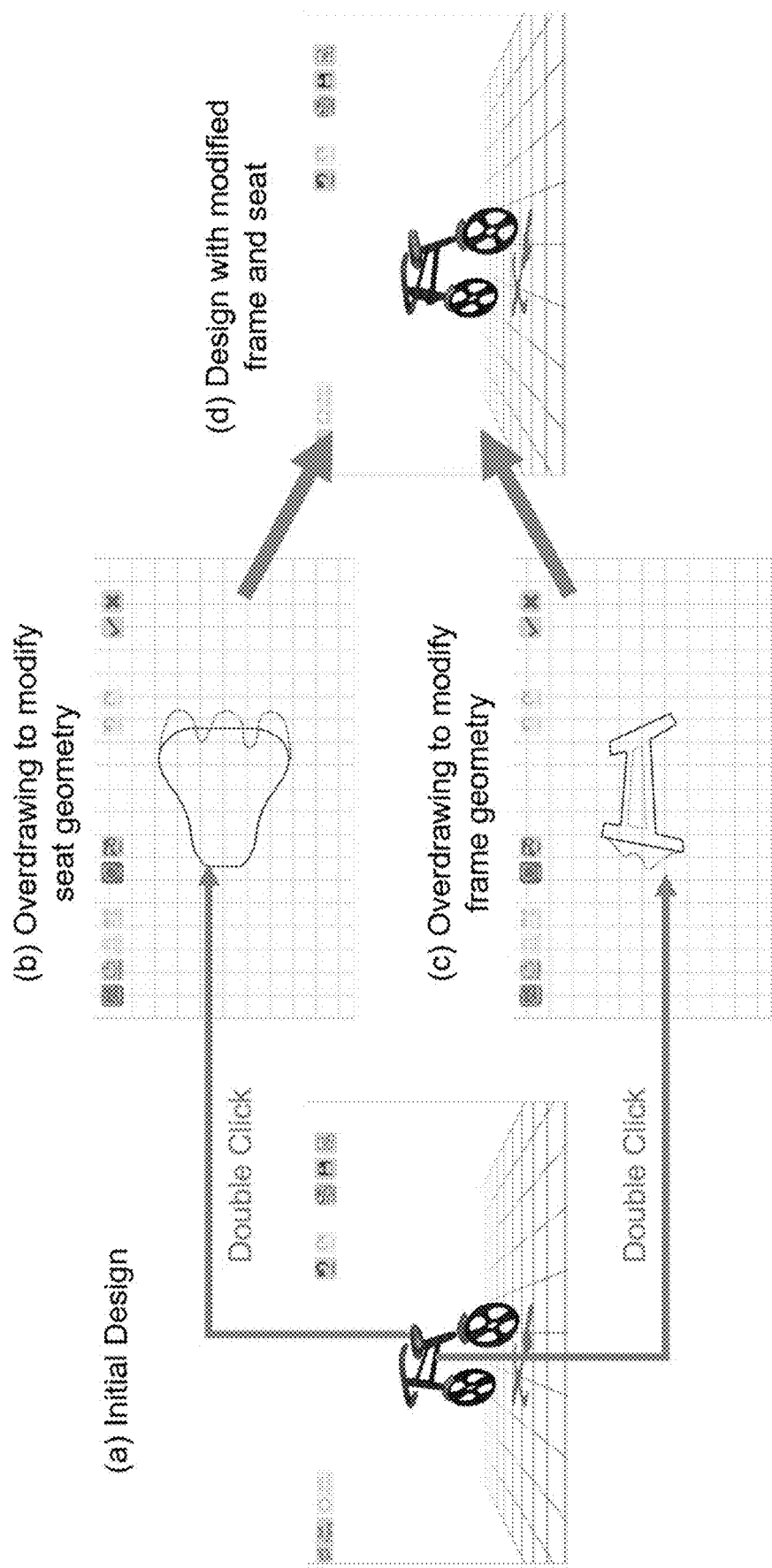
FIG. 10 depicts an overdrawing operation to modify shapes within a given domain according to one embodiment.

Overdrawing is a highly efficient curve editing technique that allows users to alter local regions on a curve by simply drawing over it using the system 1800 (FIG. 10). It is very similar to how we would correct or modify sketches on a paper, i.e. by drawing the improved strokes directly over the old ones. When providing an overdrawing stroke, just as with the shape creation process, users can utilize either the freeform or the polyline curve drawing option. The overdrawing technique can be used for several purposes. First, users can correct errors they might have made during the initial shape creation process. Second, they may choose to modify the geometry of the underlying curve so that the resulting shape in the design is altered based on evolving design decisions. Finally, this method also enables users to apply fine level details on the underlying curves (and resultantly on the shapes). Such details are hard to apply during initial shape creation because the scale of the shape and their underlying curves is at a smaller range within the 3D workspace. In the edit mode, the curves are magnified and displayed on a fronto-parallel view so that precise inputs are easier to apply on them.

Figure 11:
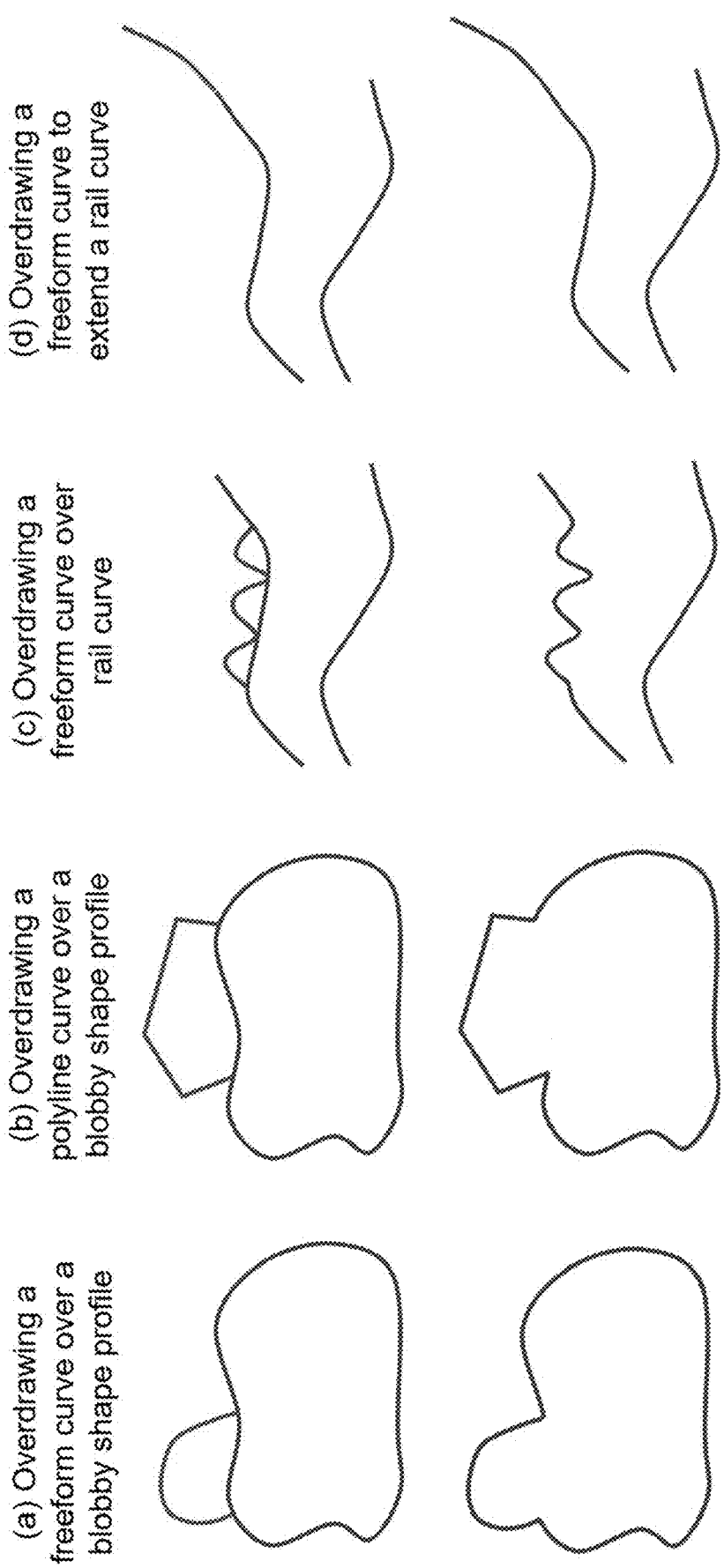
FIG. 11 depicts examples of how the overdrawing operation of FIG. 10 is used to modify both profile curves of blobby shapes and rail curves of tubular shapes.

For a blobby shapes, the overdrawn curves are drawn in such a way that their starting ending points are close to the profile of the shape (FIG. 11). Upon removing the stylus tip (or releasing the mouse button), the back end system automatically determines that the stroke input was meant as a overdrawn curve. The system then applied a curve merging algorithm, resulting in the overdrawn curve to replace the portion of the profile curve it is drawn over. This technique can be used in a similar manner to edit or add details to the rail curves of tubular shapes. However, given the open-endedness of these shapes, overdrawing can also be used to either extend a rail curve or truncate it at a certain point. Overdrawing a curve entirely across an existing profile or rail curve results in the entire curve being replaced by the overdrawn curve.

Figure 12:
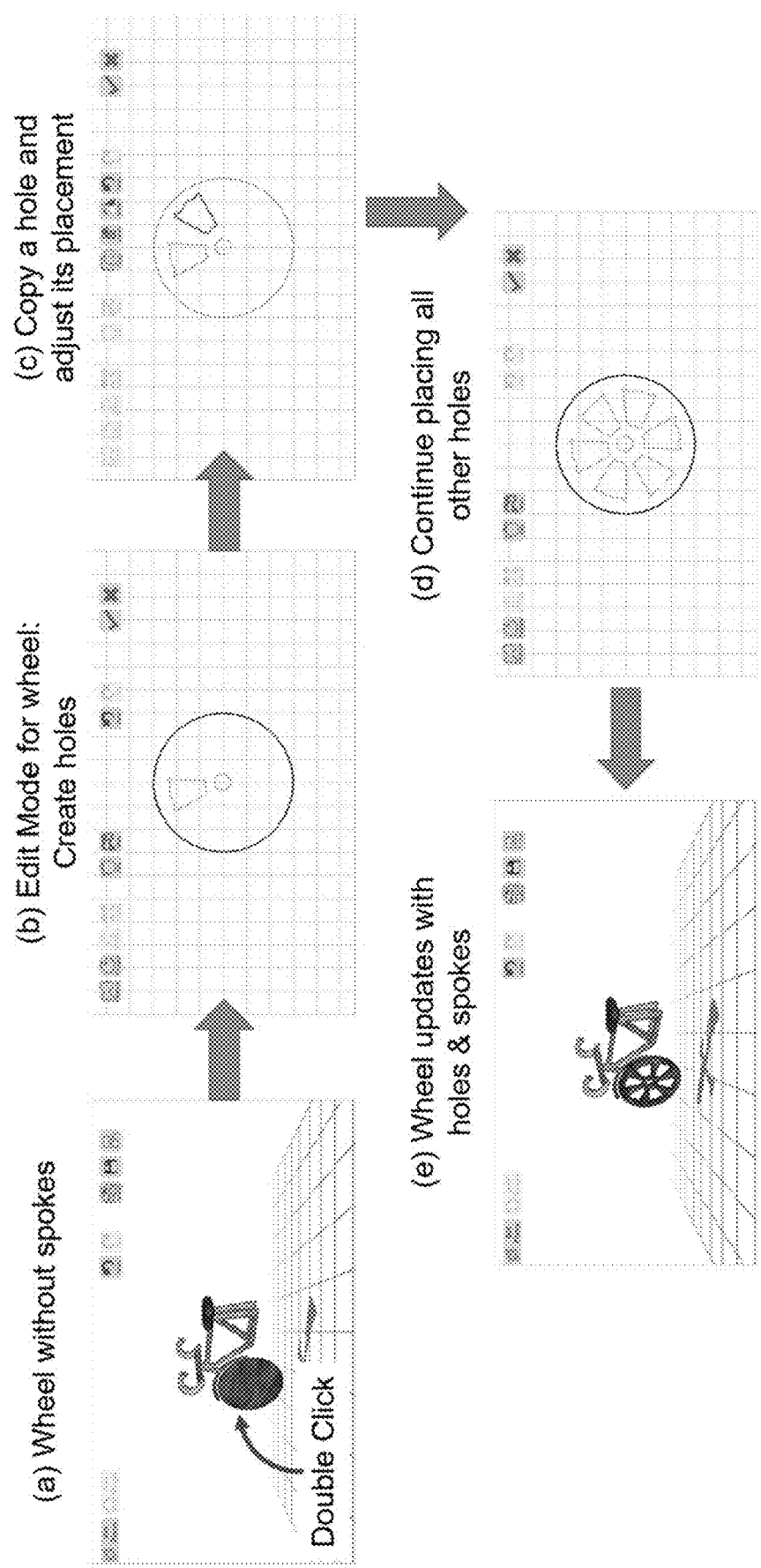
FIG. 12 depicts a hole creation process within an edit mode according to one embodiment.

Very frequently shapes within physical products contain holes for several reasons such as weight and material reduction, aesthetic quality enhancement, and functional spacing. In the edit mode users can define as many holes as they like within a blobby shape. This can be done by simply selecting the hole option and drawing a closed freeform or polygon curve within the boundary of the profile curve we want a hole inside (FIG. 12). Upon exiting the edit mode, the 3D inflated mesh updates itself such that the hole feature within the shape is also accounted for. Here, in the remeshing process, the interior points are sampled such that they only lie between the shape profile boundary curve and the boundaries of the holes defined within the profile curve. The rest of the operations are exactly identical for constructing the resulting blobby shape.

Just as with the profile curve drawing process, the interface also allows users to borrow pre-defined template curves to serve as holes within a given blobby shape. Our system can automatically detect whether or not a hole fully resides within the profile curve, and gives an error warning to the user if this condition is not met. Additionally, the system is also cognizant of holes being too close to the profile boundary curve, in order to preclude extremely thin features (which result in geometric artifacts). The hole curves are also amenable to modification, detailing, and refinement at any point during the design modeling activity. For this, the user simply needs to go the edit mode for the relevant shape (containing the hole to be edited), and apply the overdrawing inputs in order to modify the hole shape.

While the three dimensional form of a design model provides visual information on its structure, hierarchical organization of components/shapes, and the interrelationships between different parts and shapes, color and texture provide additional dimensions of design information that can be imparted with an idea or a concept. For example, textures allow designers to communicate what type of material a given shape or part could be made of, and allude towards downstream manufacturing and production capabilities/decisions. Texture can also impart broad level information on a given part or shape's physical properties such as mass, thermal/electrical conductivity, surface smoothness and traction, malleability etc. Moreover, textures and colors can significantly enhance the aesthetic quality of a design, and provide the design model with a general finished appearance even at the early stages of the design process.

To apply the texture over a shape using the system 1800, users simply need to select it first and hit the texture button (FIG. 13). This opens up a texture dialog box, with a set of predefined textures. The textures are organized according to specific material properties. While the default Sketch-2-3 interface provides a broad range of texture categories, users can also add to this library additional textures within each category or even create new texture categories. The same process can be used for applying color over a given shape, except here a color dialog box opens up. Inside this box, users can either select from a set of predefined colors or customize a color by adjusting the RGB values. Users can also choose to apply both color and texture to a given shape. This allows users to create more variability in how they express material information on a design.

Figure 14:
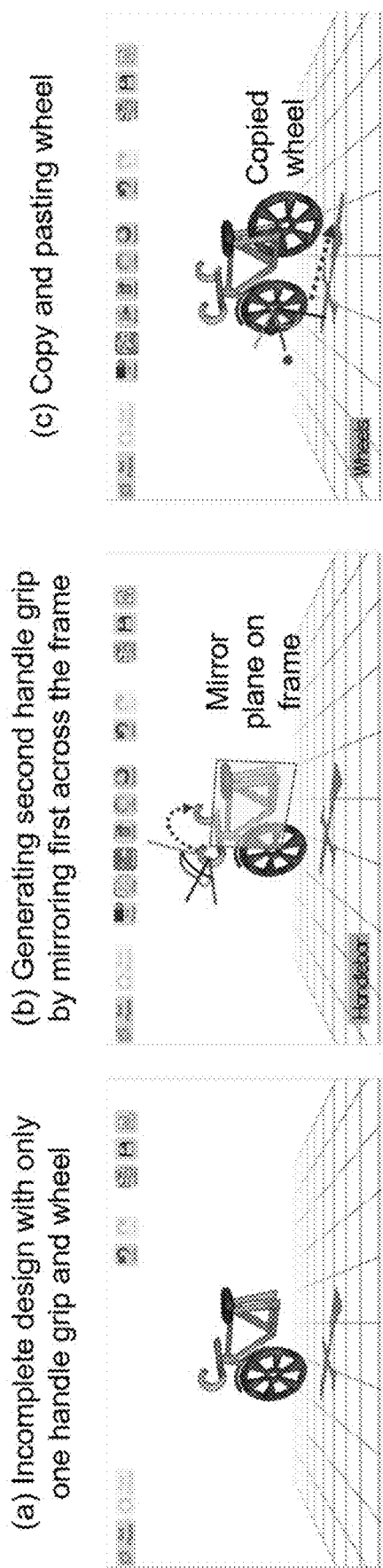
FIG. 14 depicts replication operations performed on an incomplete design according to one embodiment.

To enable users to quickly generate a pattern or symmetrical arrangement of common shapes, the system 1800 allows for copying and mirroring operations. To copy a shape users simply need to select it, hit the copy command, and define where to place it by clicking in the workspace. Mirroring operations are performed across another reference shape. Here, the shape to be mirrored is first selected, the mirror command entered, and finally the shape about which the mirror is to be performed is selected (FIG. 14). This process results in the initial shape to be copied, and the replica to be placed such that it is mirrored across the underlying plane of the second shape.

Initially when the design is constructed, it only exists as a collection of shapes, spatially arranged to achieve the form of an intended design. However the structure of a 3D design is much more complex than that. Different shapes often perform as components within a given part with a specific function in the part. Quite often, designers will want the capability to segment such parts for various design reuse and reinterpretation purposes.

Figure 15:
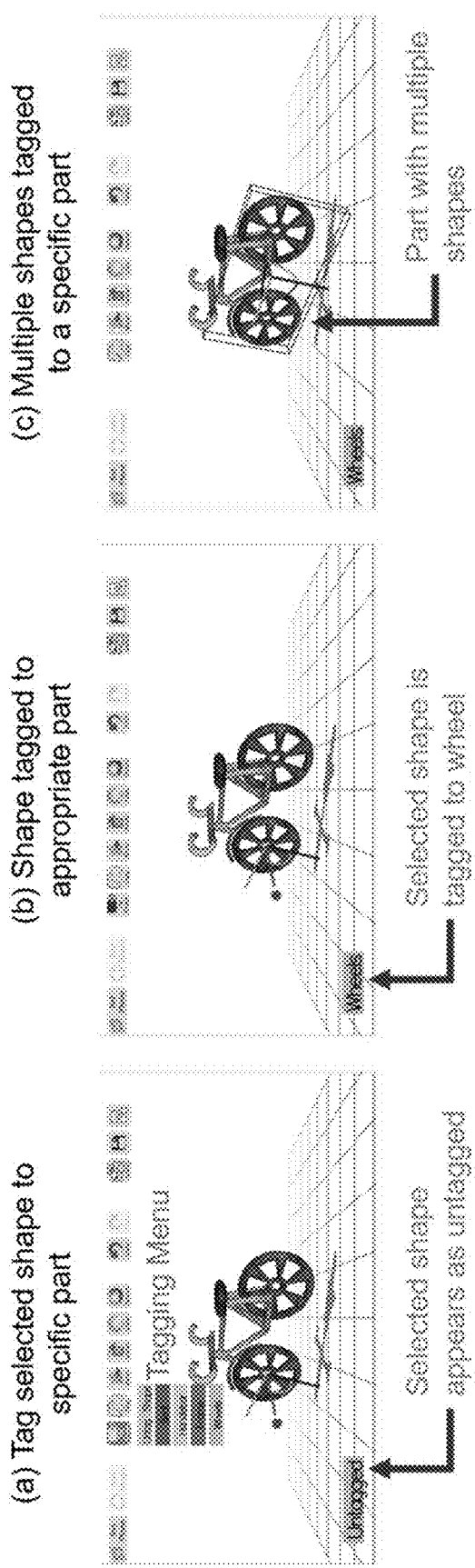
FIG. 15 depicts tagging shapes to relevant parts according to one embodiment.

To support grouping of shapes into functional parts or meaningful clusters within the design, we provide tagging capabilities. Essentially, when working within a certain design context, users can pre-define the parts the design context will comprise of across multiple iterations or variations of design ideas. Upon constructing each variation, users can simply select a shape, and assign it to one of the pre-defined parts. We call this tagging. Just as with individual shapes, parts can also be selected within the 3D workspace. Selected parts can then be subjected to operations such as spatial manipulation with a 3D widget, color/texture additions, and replication operations. Here, all the shapes included in the part gets subjected to the operations applied to the part (FIG. 15).

Figure 16:
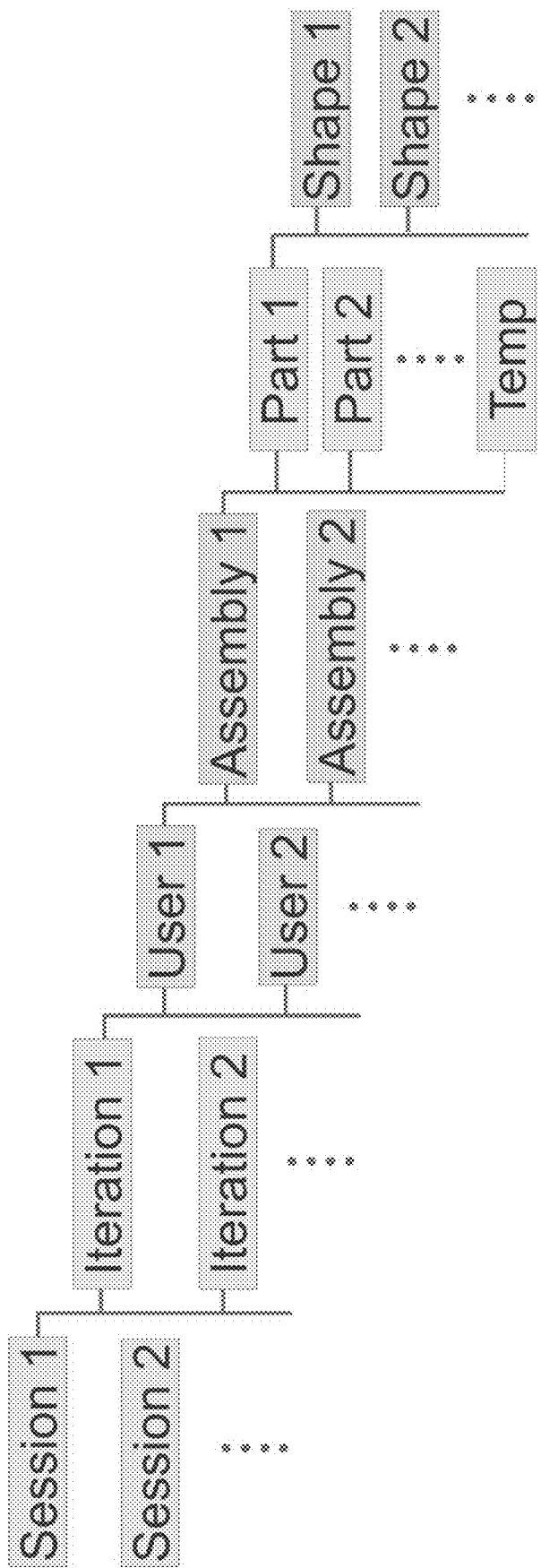
FIG. 16 depicts a data storage folder structure according to one embodiment.

Each design model is stored in a folder with a distinct numerical IDs. Just as with the design model, this folder is also hierarchically divided into subfolders, each containing shapes from a specific part, and also includes a temporary folder for untagged shapes (FIG. 16). To store shape information, we defined a text file format containing the 3D vertices of the shapes underlying profile curves along with other appearance data (e.g. texture file location, scale, inflation magnitude etc., see FIG. 17). Whenever a design is imported or loaded, the metadata from each shape file is read by the system and corresponding shapes regenerated in the workspace.

In the presently disclosed system, the design explorer interface is the central element that supports all team-first design activities such as design data storage, hierarchical design information retrieval, design space navigation, and design reuse/reinterpretation. It visually represents the design concept space developed by the design team, and serves as a medium for storing, browsing, sharing and accessing design ideas. The design explorer can be directly opened and viewed within the 3D workspace, and is represented as a list of thumbnails, each showing a specific design concept. Each concept can be further expanded into a sub-menu displaying a closeup view of the individual parts within the design. The design explorer comprises of the following attributes that to support efficient navigation of the design concept space and fluid sharing of design ideas across team members.

Figure 19:
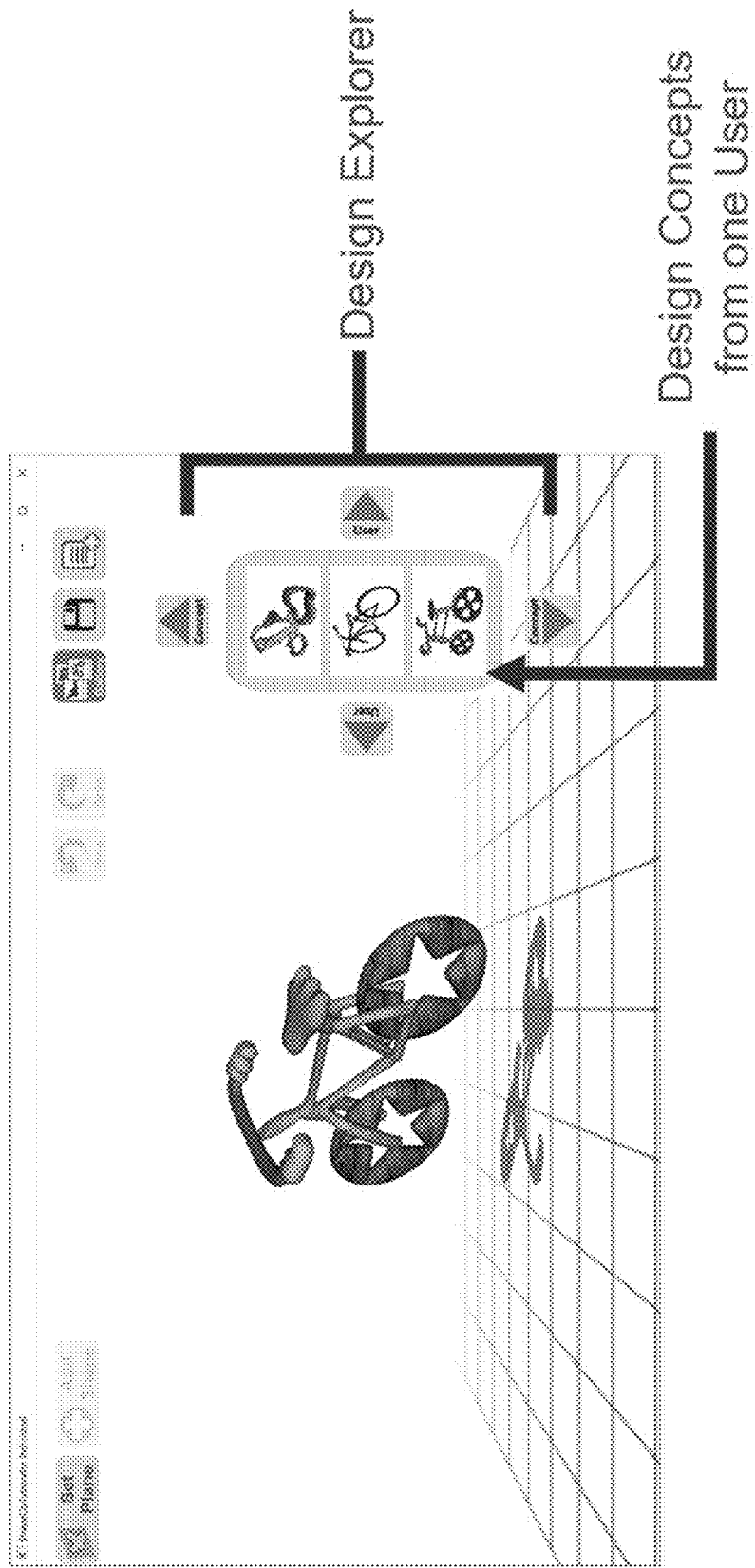
FIG. 19 depicts a design interface wherein concepts associated with a user are selectively displayed as a list of thumbnails is a first axis direction, and users may be selected in a second axis direction according to one embodiment.

As illustrated in FIG. 19, the design explorer can be viewed as a single column menu with concept thumbnails listed as menu items. At a given instance the explorer displays the most recent designs from a particular team member, and can be vertically scrolled to view his/her previous concepts. It can also be laterally scrolled to view designs across other team members. This organization of the explorer is used for several reasons. First, it allows us to group design concepts by specific designers, allowing team members to know where each shared design came from. Second, a single column view helps avoid clutter within the design workspace, while still allowing designers to navigate the concept space during a modeling activity. It shall be understood that other variations on this arrangement may be used. For example, the user concepts may be alternately displayed in the row and laterally scrolled, with the user selection being vertically scrolled.

Being able to observe and reflect on others' ideas during a design activity not only inspires creativity but also helps identify new possibilities in one's own design. Thus, the design explorer of FIG. 19 may be opened at any point during a design activity, and its placement appears within the 3D workspace itself. Given that the explorer is only a list of thumbnails, it can be placed such that it is non-intrusive to the visibility of the 3D workspace and its constituent design model under progress. Thus, a user can concurrently browse through the explorer while creating his/her design model, without having to explicitly switch modes or enter a new window/view.

Figure 20:
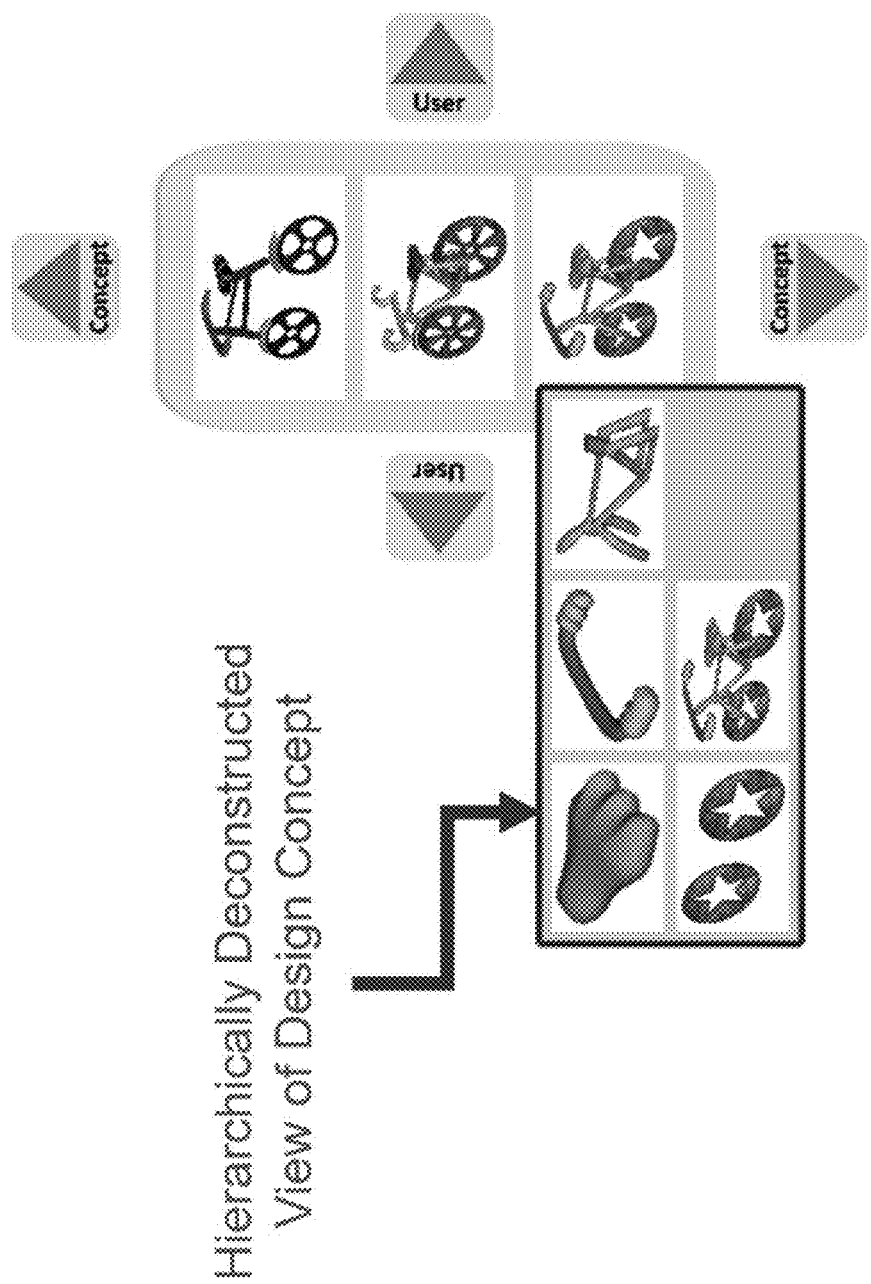
FIG. 20 depicts a design interface wherein varying levels of detail are displayed to a user according to one embodiment.

An important advantage of 3D design representation is that it provides designers with the ability to hierarchically deconstruct a design idea, and work with it at varying levels of details. Thus, the design explorer of FIG. 19 supports navigation of the design concept space in a hierarchical manner such that users can not only browse through multiple design concepts in their entirety, but also take a closer look interesting or relevant designs at different levels of details, as shown in FIG. 20. As shown in FIG. 20, users can view a design concept at varying levels of details, namely (a) full design concepts, (b) individual design parts, (c) constituent shapes, and (d) underlying geometries. This also allows designers to only share/retrieve design information pertinent to a specific context or level of detail, without having to import the full model itself. Thus, hierarchical navigation facilitates streamlined sharing and exchange of design information, making the overall system amenable using cloud-based data storage structures. The ability to hierarchically decompose and browse through concepts allows users to search for creative inspiration within focused contexts and uncover design solutions and new ideas pertinent to specific levels of details.

Figure 21:
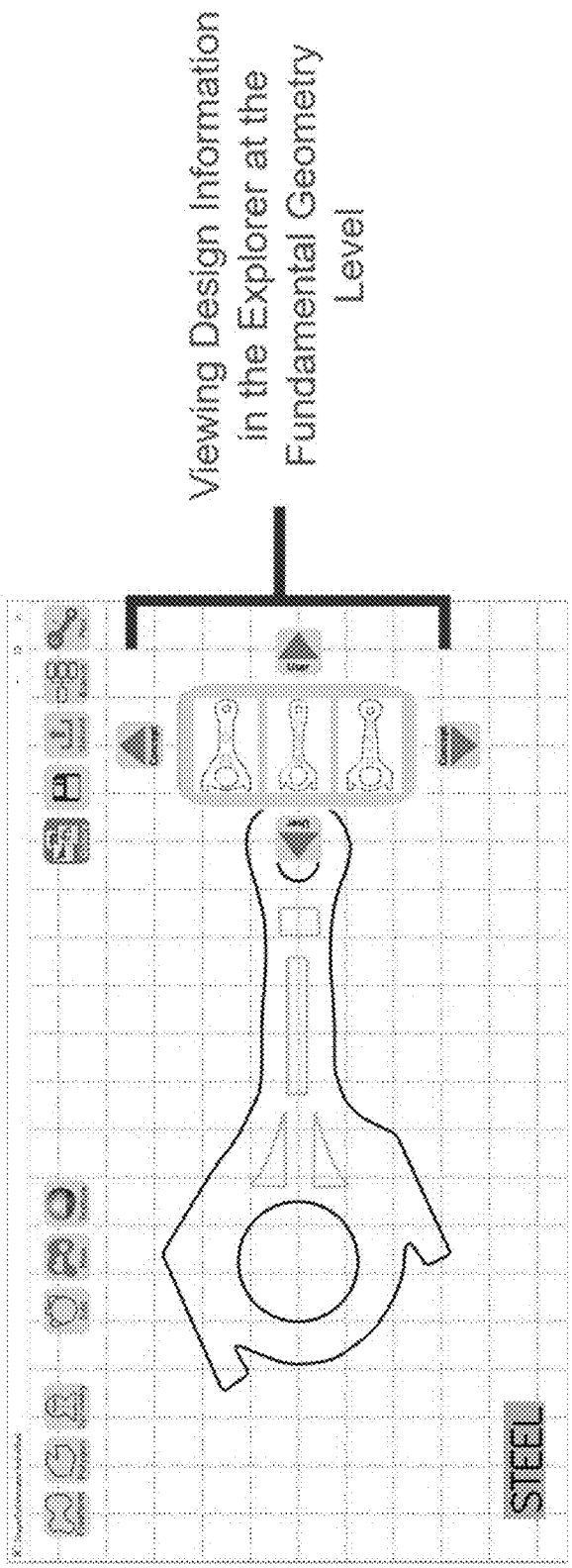
FIG. 21 depicts a design interface sketch/edit mode according to one embodiment.

The design explorer of FIG. 19 by default shows thumbnails of the full design concepts. When a given concept is selected in the explorer, a secondary menu pops up with thumbnails showing a close up view of the concept's constituent parts, separate from the design. The design explorer can also be extended to an edit mode as shown in FIG. 21 where the underlying geometric entities defining specific design shapes can be shared and borrowed. Thus, the design explorer adapts its content based on whether the design activity is in the 3D modeling or 2D editing mode.

Hierarchical navigation is consistent with the notion of working with multiple design ideas in parallel. Being able to view different concepts in the design explorer, while working on their own designs, helps inspire new ideas not just for their current design, but also for divergent concepts they went on to explore in future iterations. The presently disclosed design explorer interface takes this a step further by allowing users to work with multiple designs not just at the concept level, but also at the part and shape levels.

Figure 22:
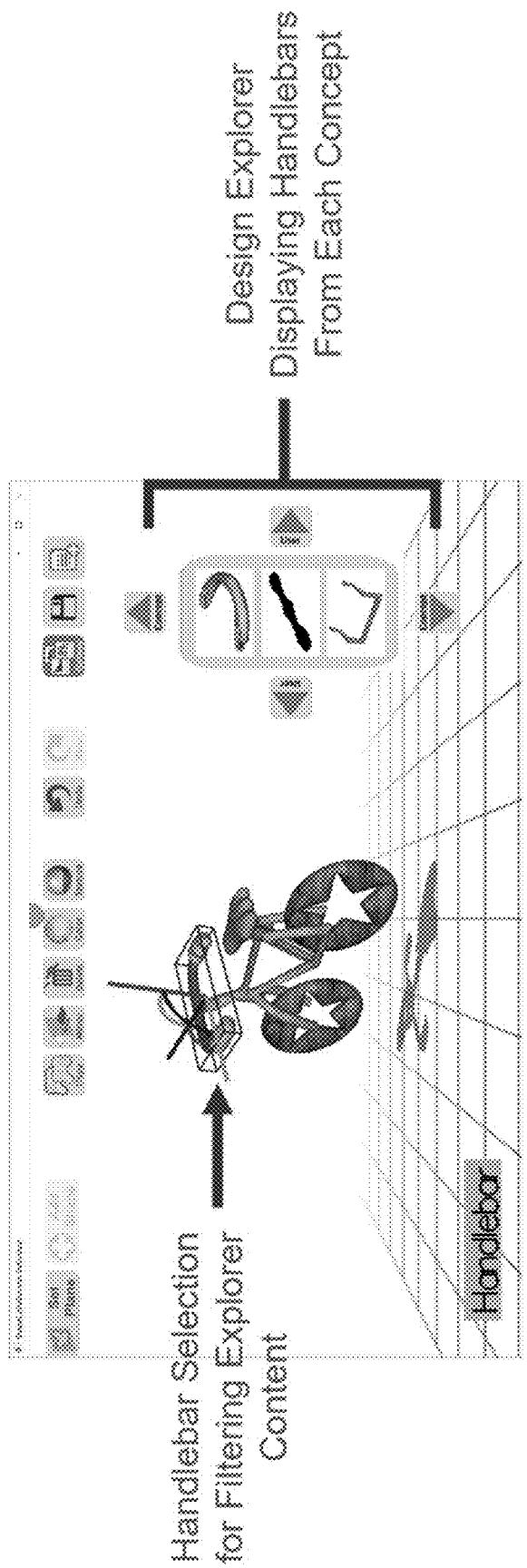
FIG. 22 depicts a design interface wherein design variations for a component are automatically displayed when a user selects the component in a displayed model according to one embodiment.

The hierarchical structure of 3D designs can have multiple levels of details, starting from the overall design concept, to the individual parts, their constituent shapes, and the underlying geometry defining the shapes. Thus, if a designer chooses to browse through the concept space with respect to a lower level design information, he/she will have to go through all higher level design information first. To prevent such tedious navigation of the concept space, the presently disclosed design interface allows users to isolate specific design components or information that are relevant to a particular modeling activity as shown in FIG. 22. This also enables designers to efficiently search for ideas with respect to a specific design context. The mode of FIG. 22 may also be used when a design model is active within the 3D workspace. By selecting a specific part or shape on the design model, users can filter the explorer such that only the corresponding parts from the concept space are displayed. Here, the selection in the modeling space serves as a query input for filtering the explorer content. This mode is mainly used to search for specific parts or shapes for a design already under progress. As a user progresses through a design model, he/she may require specific things that can be quickly obtained using the filtering mechanism in the design explorer. It serves as an efficient means to quickly search and identify a relevant part (or shape) without going through multiple menu levels, while enabling collaborative operations such as substituting parts or shapes in the design, or finding a suitable design component.

The newest designs in the concept space typically represent the most recently developed ideas. In fact, within a collaborative design scenario, the most recent designs are those that have been derived from prior iterations, and polished through several stages of development. In certain embodiments, such newer designs are displayed first to provide designers with a quick overview of the current state of the design concept space. It also prevents designers from having to dwell over defunct design concepts or ideas, and helps avoid pitfalls or mistakes encountered by other team members at a previous time.

To ensure that each member gets credit for his contributions and to track the history of a design's evolution, each concept should be identifiable to its author. In certain embodiments, at any given instance, the presently disclosed design explorer interface displays the designs of one user. However, designs by other users can be viewed and access simply by scrolling across different user ids. Within the design explorer, a single column or strip of thumbnails represent designs created by a specific user. A designer within a team can opt out of the design project. However, once uploaded to the shared repository, his/her designs remain within the explorer for the remaining duration of the design project.

The presently disclosed system maintains two distinct repositories for storing and retrieving design data. These are the local repository and the shared repository. During a design activity, users can choose to share their designs and ideas only when they feel ready to do so. This helps avoid evaluation apprehension, and provides team members with the freedom for independent thinking without having to fear judgement of fleeting ideas or premature thoughts. This also allows them to develop an idea to a level, which they can confidently claim ownership of. Each design created by users is initially stored locally within their individual systems. This local repository is only accessible to that particular user. At this point, the private designs of a given user are displayed only in his/her respective design explorer. However, users can invoke the upload option in order to transfer the design content into the shared repository. Once a design has been shared, it is visible in the design explorer across all design team members, and can be accessed for reuse or reinterpretation.

During a design activity, users can browse through the design explorer and import any design or its component from the explorer directly into their workspace. Here also, the hierarchical and filtered browsing modes can be leveraged to import either the entire concept or just a specific component. Design data can be imported from the explorer in two ways.

Figure 23:
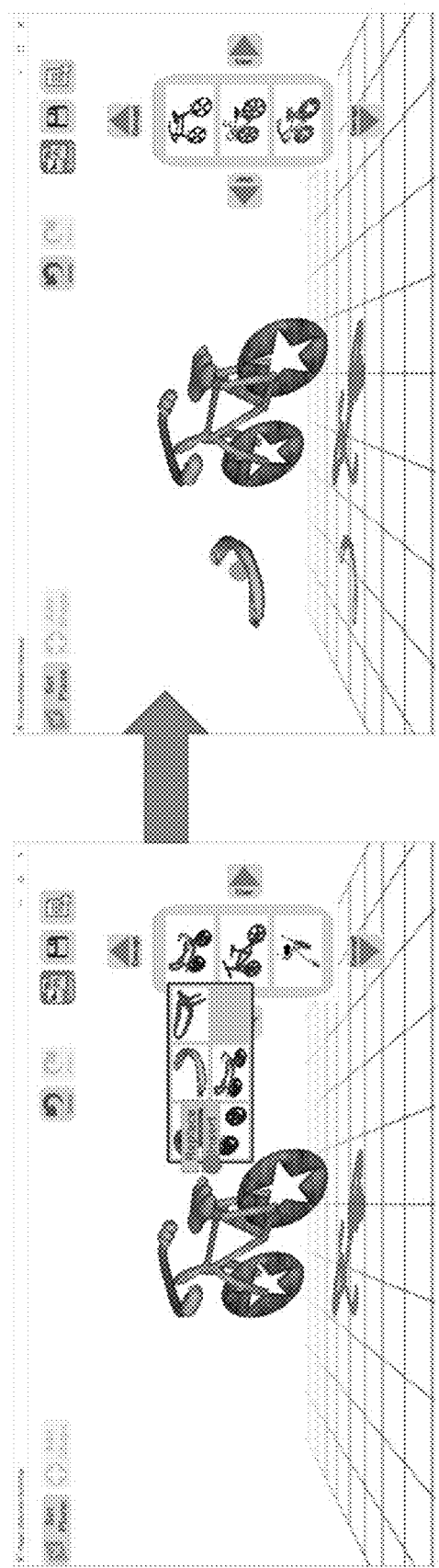
FIG. 23 depicts a design interface wherein a shape from a first design model is selected and inserted in a display of a second design model.

Insert operation: As shown in FIG. 23, this operation makes a copy of a full design model or a single part and places it in the workspace at a location specified by the user. It does not displace or remove any of the design components prior to the insertion operation. Instead, this operation can be used to add new shapes, components, or design features within the design under progress. It is also a useful tool to fill in voids within the design or reduce modeling time by quickly borrowing or repurposing a design component from within the concept space. FIG. 23 illustrates inserting a shape from another design concept within the 3D workspace: (left) Using the design explorer to Identify a shape (handlebar) to add to the 3D design model in the 3D workspace, (right) Placing the inserted location at a specific location in the workspace.

Figure 24:
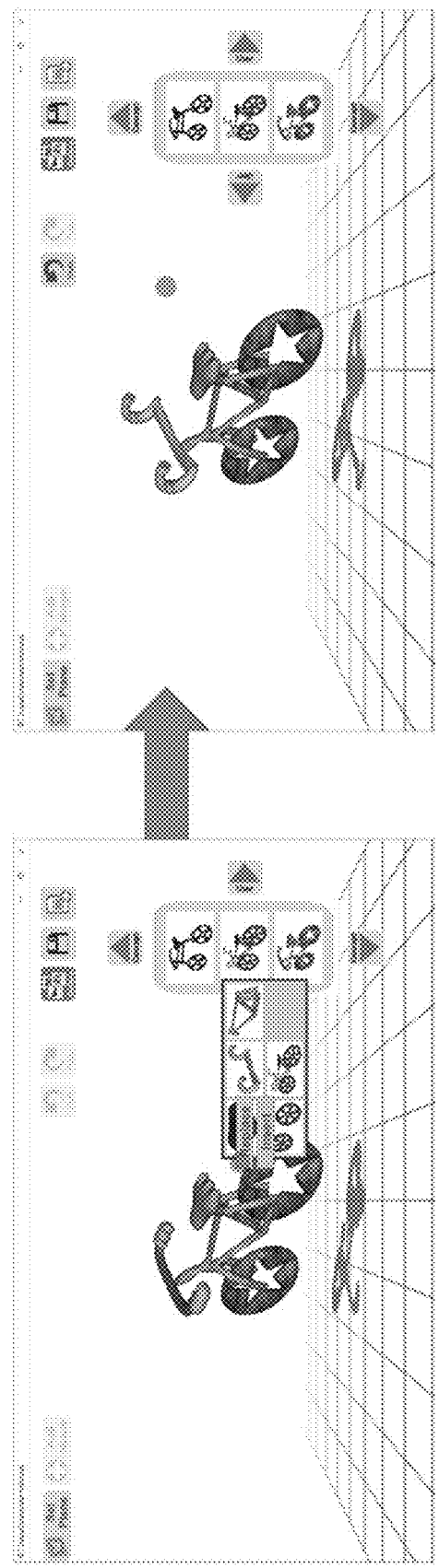
FIG. 24 depicts a design interface wherein an existing part within a displayed first design model is replaced by a corresponding part from a second design model according to one embodiment.

Replace operation: A given part in the workspace can be substituted with a corresponding part from another design in the explorer as shown in FIG. 24. This operation first removes the original part from the workspace, generates a copy of the new part, and places it at the same location in the design. In order to match the location and orientation of the previous shape, computes the minimum bounding box of the two parts. The new part is then scaled and oriented in such a way that its bounding box matches the size of the bounding box of the previous part, and the two are also aligned along their principal directions. Besides replacing individual parts, a full design model can also be replaced with another concept model, if the user chooses to do away with the whole design.

Figure 25:
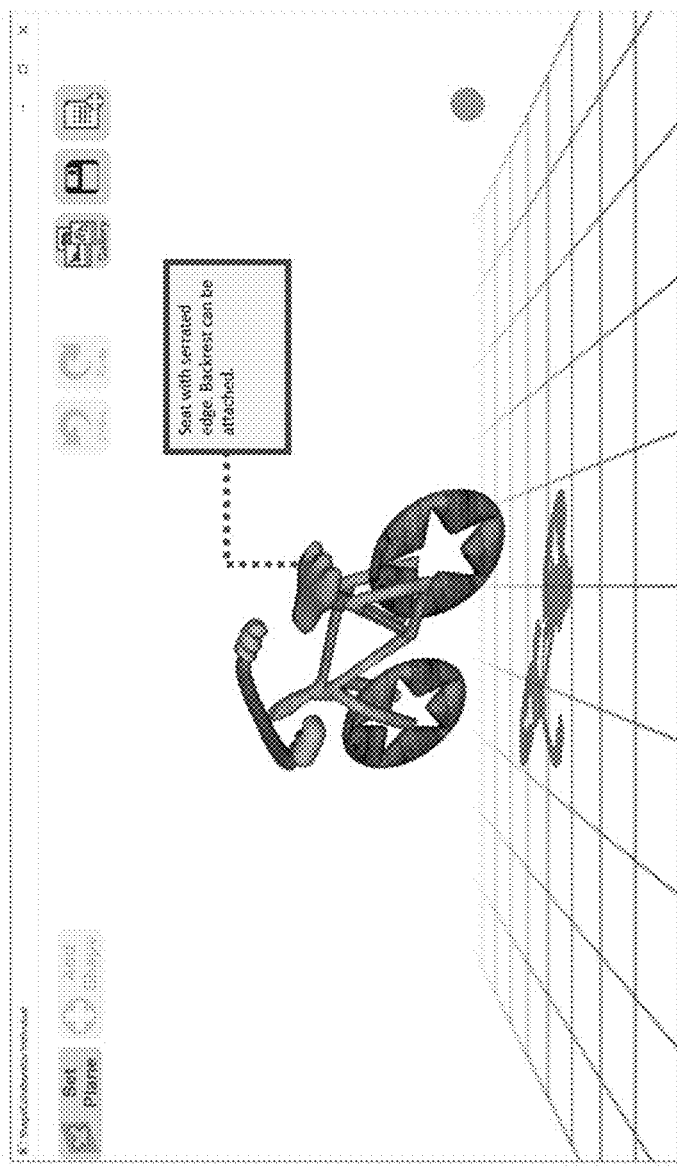
FIG. 25 depicts a design interface wherein an annotation is added to a displayed design model according to one embodiment.

Annotate operation: Users can accompany their designs, or specific design components with annotations and comments in order to better communicate the information about the design concepts and their ideas as shown in FIG. 25. In addition, comments also stand out as means to elicit feedback or request help in improving, refining, or advancing a certain design concept. Users can annotate a design or a component by simply clicking on it and hitting the comment button. This invokes a text entry window, where users can add their comments and also sketch out visual information, similar to a paint application. This annotation is always associated with its respective design content and can be accessed by other designers when placed within the shared repository.

Chat operation: The chat box in Co-3Deator allows designers to send private or group messages electronically. This messaging system is particularly useful for distributed design teams where direct verbal communication is not feasible, or for sending information to specific team members in a private manner. In addition to textual messages, users can also share design ideas through this chat box by privately transferring design data files of images (screenshots) to specific collaborators.

Modify operation: It is not essential that the imported design component has to be retained in its exact form. Users can always apply editing operations to change its form, scale, or appearance. This way users can create a wide variety of variations of a given design. In fact, shapes or design components can also be reinterpreted to allow designers to use ideas from one context within a completely different context. Being able to borrow, reuse, and reinvent existing design concepts leads to a more expansive exploration of the concept, a larger number of early-stage ideas, and more insights leading to better product development.

Each team member can use the 3D modeling features of the presently disclosed system to generate as many design concepts as they can on their own. While the system serves as a team-first ideation tool, by necessity it also comprises elements from a designer-first tool. This is because in order to support any collaborative design process, there needs to be some form of a design concept space available. Thus, individual design creation can be used by design teams to initialize the concept space. The main strength of a team-first approach however lies in its support towards creative productivity. Here, inputs from multiple users along with the combinatorial and divergent affordances of the concept component hierarchy allow design teams to rapidly expand their concept space. The system supports creative work where the focus is on creating multiple, separate, and diverse content, often drawing on other collaborators. This kind of productivity cannot be achieved with just a designer-first approach. Such "team-first" design operations are as follows.

Figure 26:
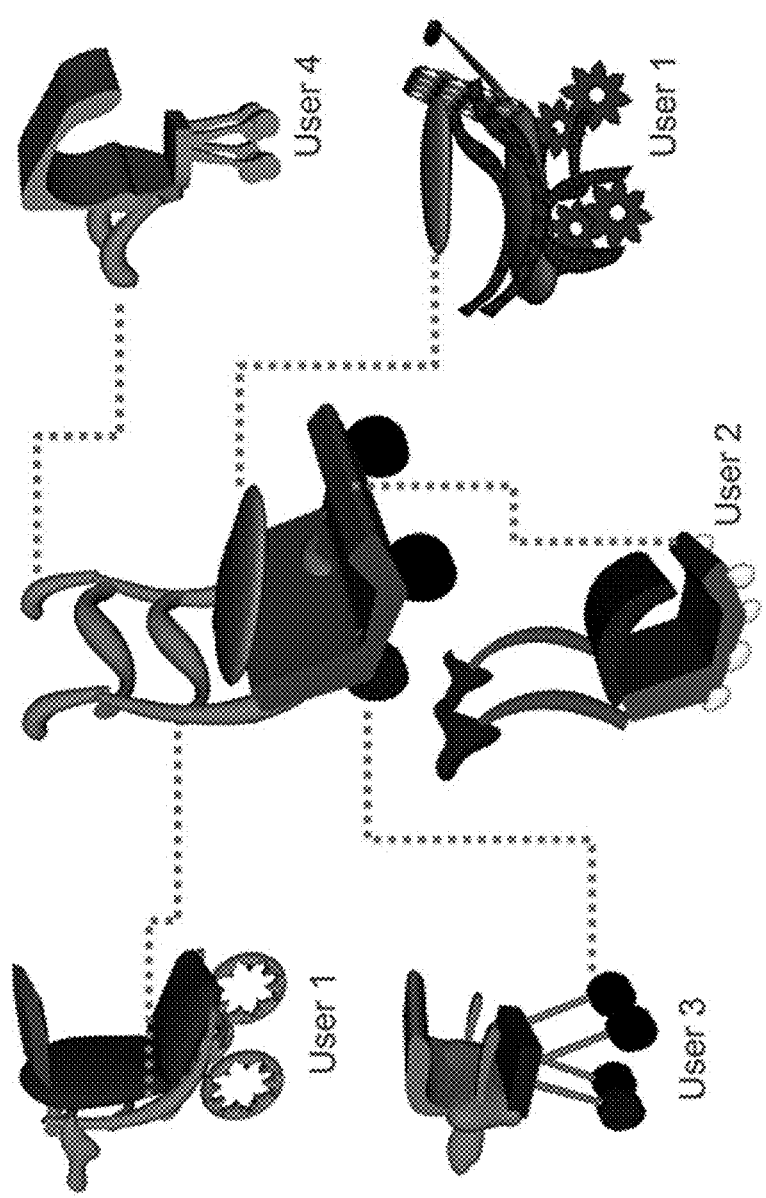
FIG. 26 depicts a design interface wherein design model is generated using combinations of components from different design models.
Figure 27:
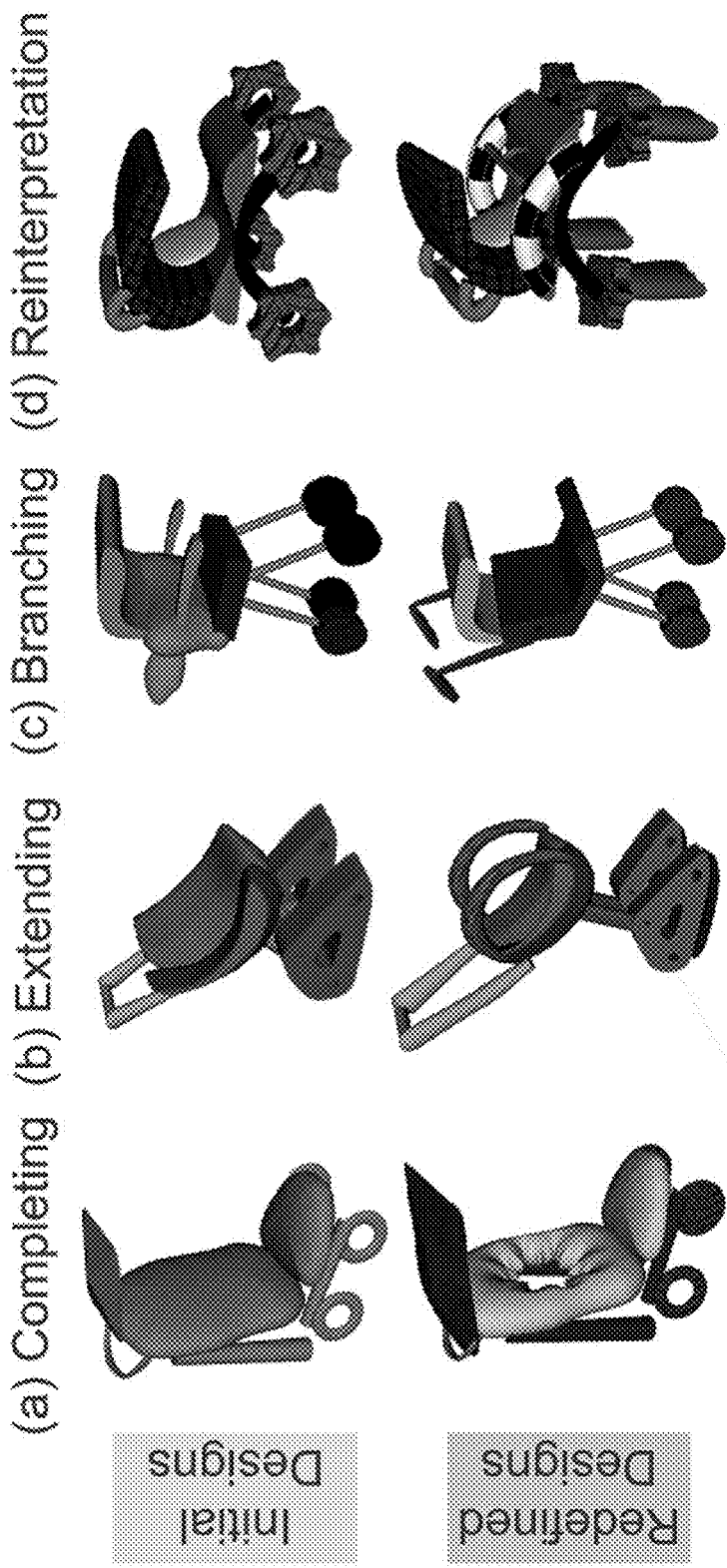
FIG. 27 depicts redesign of initial models into redefined models according to one embodiment.

The goal of combinatorial design operations is to expand the concept space through quick combination of parts and shapes from different designs available in the design explorer. Here, users can deconstruct individual designs at various levels of details and combine specific components from different design concepts to generate new concepts using the presently disclosed system. The concept component hierarchy driving the 3D design models in Co-3Deator provides users with the freedom to selectively choose what level of design information to work with from a given concept. However, simply putting parts together does not lead to an aesthetic or structurally sound design. Instead, the ability to isolate, manipulate, and reconfigure individual shapes within a given part is what allowed users to adapt it to a new design context. As shown in FIG. 26, the presently disclosed system provides users with the ability to not only change the scale and appearance of an imported shape, but also modify its geometry so that it better fits new design context.

Combinatorial design in the presently disclosed system can be approached in several ways. One approach entails importing a central part that serves as a base or foundational structure of the new design model, followed by adding other parts that fit well with it. This approach is analogous to how we assemble a product in real life, where a primary structure is first established and then the rest of the parts assembled on top. Another approach involves browsing through the explorer and importing all parts that stand out as potentially providing some value. Various configurations can then be tested out with these parts, while pruning out those that didn't work with the intended design context. This approach ultimately converges to a specific design concept, and allows designers to visually explore many different options and possibilities within the design concept space.

Using the design explorer interface system disclosed herein, designers can also take an existing design and redefine it into a new concept, however they find it fit. They could either choose a design created by themselves at a previous time, and branch it into a different version, generate a design variant of their teammates' design, modify it to form an entirely different design concept, or improve upon an existing design. Here also the concept component hierarchy gives users the flexibility to alter a design at multiple levels of detail. Thus, the redefinition can occur at a shape, part, or the entire design concept level. When redefining a design, the original version is retained within the design explorer, such that multiple designers can drive it in different directions. This also allows the design team to keep a history of a given design, and enable each member to track its evolution.

The following collaborative design operations can be performed using the design redefinition capabilities in the presently disclosed system: completing, extending, branching and reinterpretation, as shown in FIG. 28 and described below.

Completing: Given the time limits within collaborative design work sessions, some designs might exist as incomplete models within the design explorer. Incomplete designs can also occur as one designer might stumble upon a roadblock while developing a certain concept. In such cases, there is a strong likelihood that other team members are inclined to bring such designs to a closure or completion. Thus, users can take an existing design that presents a scope for improvement, and further work upon it such that it meets the functional and structural requirements.

Extending: It is very common for users to seek out ways to augment a design either to improve its functionality or add another capability. The design explorer provides users with a visual means to not only draw upon designs from their collaborators, but also judge what was earlier missed in every design concept with the design space generated. This provides design team members to identify what could work better in their collaborators' designs and further add upon it to create an improved version.

Branching: This process involves taking an existing design and applying modifications such that results in a variant of the original concept, but novel enough to stand on its own. Such variants can be obtained by changing the color, texture, and style of one or more parts within a design. Branching is primarily useful in versioning a given design concept, and creating different models of a product context.

Reinterpretation: To save time, users can borrow one or more shapes from a specific part and repurpose them into another object with an entirely new meaning and function. In fact, the shapes repurposed can be used within a different design context as well. This provides design teams to parallelly work with different design contexts in their projects, while still maintaining exchange of design information across contexts.

To close a collaborative design ideation activity, design teams frequently perform a final concept selection task in order to collectively reflect on the overall design concept space and identify final concepts to push towards downstream design processes. During this activity, users can simply browse through the design explorer and inspect each design at varying levels. The designs and their components can also be imported into the 3D workspace interface of the disclosed system for closer inspection and evaluation of design concepts. The design team members can then either utilize verbal discussion, in person or through digital communication media, or communicate through the chat mechanism in their workspaces, to decide upon the final concepts.

For refining the final concepts, the design team can also collectively refine the final concepts to everyone's liking and to ensure that the design objectives are met. For this, a collaborative designing mode is provided in the presently disclosed system, where a common interface is shared across all users. Here, each user is able to see the events within the common interface on his/her personal device. However, only one user is able to interact with the interface at a given time. This is controlled through an explicit active user specification mechanism, and can be decided by the users themselves. During the collaborative design mode, the active model within the common 3D workspace is stored within the shared repository. The interface in each team member's device constantly listens to changes to the active design model, and updates the 3D model in each device. This allows each member to observe real time changes within the concepts under refinement. Additionally, it allows the active user can also illustrate ideas through direct examples and 3D modeling illustrations, as he/she is verbally explaining.

Figure 18:
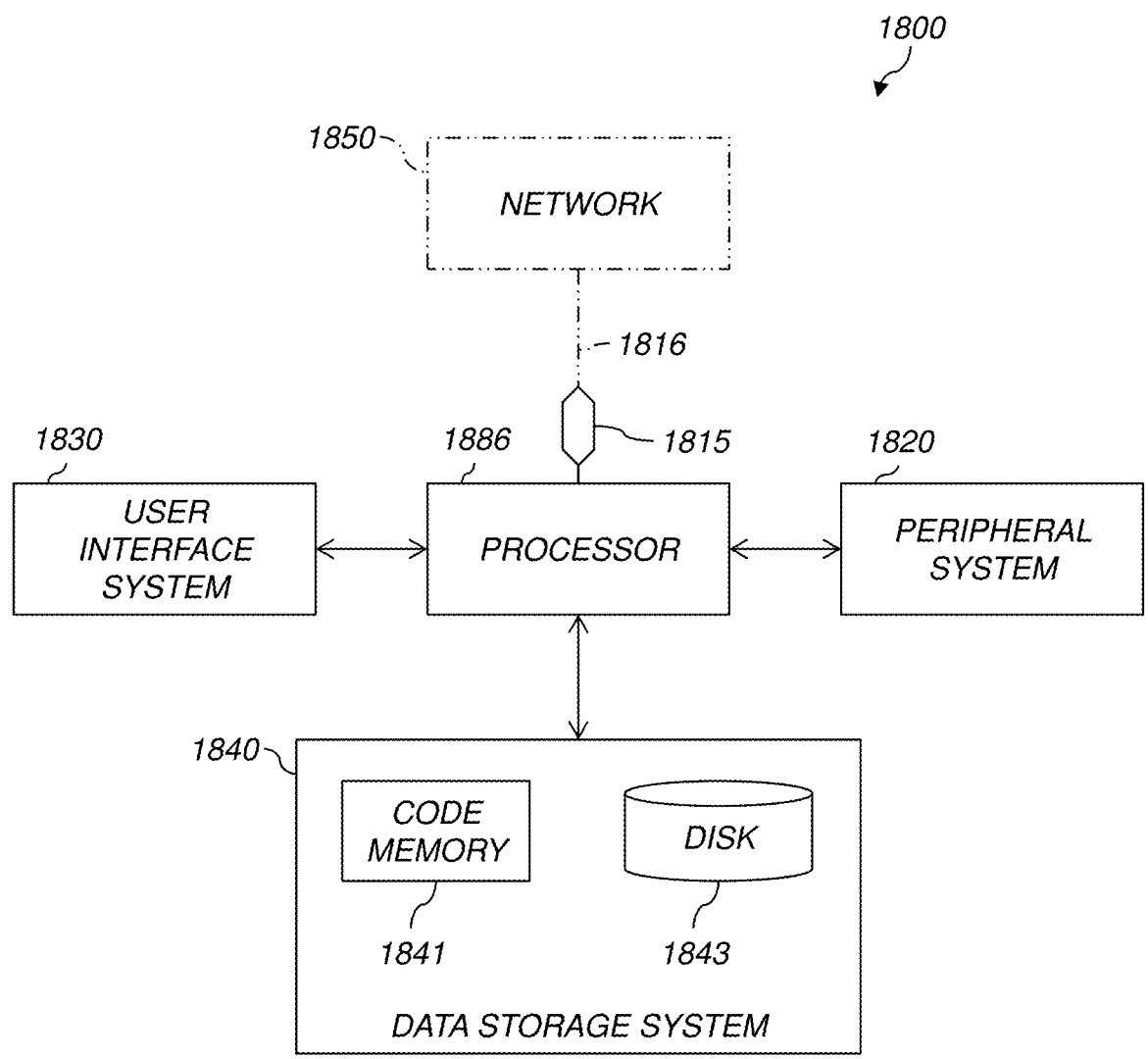
FIG. 18 depicts a data processing system for implementing the process of FIG. 1 according to one embodiment.

FIG. 18 is a high-level diagram showing the components of one example of the system 1800 for analyzing data and performing other analyses described herein, and related components. The system 1800 includes a processor 1886, a peripheral system 1820, a user interface system 1830, and a data storage system 8. The peripheral system 1820, the user interface system 1830 and the data storage system 1840 are communicatively connected to the processor 1886. Processor 1886 can be communicatively connected to network 1850 (shown in phantom), e.g., the Internet or a leased line, as discussed below. It shall be understood that the system 1820 may include multiple processors 1886 and other components shown in FIG. 18. The 3D sketch and object data described herein may be obtained using network 1850 (from one or more data sources), peripheral system 1820 and/or displayed using display units (included in user interface system 130) which can each include one or more of systems 1886, 1820, 1830, 1840, and can each connect to one or more network(s) 1850. Processor 1886, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1886 can implement processes of various aspects described herein. Processor 186 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 186 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1820, user interface system 1830, and data storage system 1840 are shown separately from the data processing system 1886 but can be stored completely or partially within the data processing system 1886.

The peripheral system 1820 can include one or more devices configured to provide digital content records to the processor 1886. For example, the peripheral system 1820 can include digital still cameras, digital video cameras, cellular phones, or other data processors. The processor 1886, upon receipt of digital content records from a device in the peripheral system 1820, can store such digital content records in the data storage system 1840.

The user interface system 1830 can include a touchscreen, hand-held stylus, mouse, a keyboard, another computer (connected, e.g., via a network or a null-modem cable), or any device or combination of devices from which data is input to the processor 1886. The user interface system 1830 also can include a display device, a processor-accessible memory, or any device or combination of devices to which data is output by the processor 1886. The user interface system 1830 and the data storage system 1840 can share a processor-accessible memory.

In various aspects, processor 1886 includes or is connected to communication interface 1815 that is coupled via network link 1816 (shown in phantom) to network 1850. For example, communication interface 1815 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1815 sends and receives electrical, electromagnetic or optical signals that carry digital or analog data streams representing various types of information across network link 1816 to network 1850. Network link 1816 can be connected to network 1850 via a switch, gateway, hub, router, or other networking device.

Processor 1886 can send messages and receive data, including program code, through network 1850, network link 116 and communication interface 1815. For example, a server can store requested code for an application program (e.g., a JAVA applet) on a tangible non-volatile computer-readable storage medium to which it is connected. The server can retrieve the code from the medium and transmit it through network 1850 to communication interface 1815. The received code can be executed by processor 1886 as it is received, or stored in data storage system 1840 for later execution.

Data storage system 1840 can include or be communicatively connected with one or more processor-accessible memories configured to store information. The memories can be, e.g., within a chassis or as parts of a distributed system. The phrase "processor-accessible memory" is intended to include any data storage device to or from which processor 186 can transfer data (using appropriate components of peripheral system 1820), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1840 can be a tangible non-transitory computer-readable storage medium, i.e., a non-transitory device or article of manufacture that participates in storing instructions that can be provided to processor 186 for execution.

In an example, data storage system 1840 includes code memory 1841, e.g., a RAM, and disk 1843, e.g., a tangible computer-readable rotational storage device such as a hard drive. Computer program instructions are read into code memory 1841 from disk 1843. Processor 186 then executes one or more sequences of the computer program instructions loaded into code memory 1841, as a result performing process steps described herein. In this way, processor 1886 carries out a computer implemented process. For example, steps of methods described herein, blocks of the flowchart illustrations or block diagrams herein, and combinations of those, can be implemented by computer program instructions. Code memory 1841 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1886 (and possibly also other processors), to cause functions, acts, or operational steps of various aspects herein to be performed by the processor 1886 (or other processor). Computer program code for carrying out operations for various aspects described herein may be written in any combination of one or more programming language(s), and can be loaded from disk 1843 into code memory 1841 for execution. The program code may execute, e.g., entirely on processor 1886, partly on processor 186 and partly on a remote computer connected to network 1850, or entirely on the remote computer.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A 3D modeling system, comprising:
   a) a computer processing unit;
   b) a digital memory; and
   c) an electronic display, the computer processing unit and the digital memory configured to:
   d) using the electronic display, provide 3D model representations of a first plurality of versions of an object component for a first user, the versions being selectable along a first axis; and
   e) using the electronic display, provide a plurality of user identifications which are selectable along a second axis, wherein selecting a subsequent user causes a second plurality of said versions of said object component to be displayed on the electronic display;
   wherein the processor and the digital memory are further configured to:
   f) receive a silhouette of the object from a user input device;
   g) automatically fill in the region within the silhouette with a 3D mesh, wherein the mesh approximates a geometry of the object; and
   h) display the object on the electronic display.

2. The system of claim 1, wherein the hand-held user input device is a stylus.

3. The system of claim 1, wherein the silhouette defines a blobby shape.

4. The system of claim 3, wherein the computer processing unit and digital memory are further configured to populate an inner 2D region within the profile boundary with a set of interior vertices, with grid points lying within the profile used as interior vertices, apply a constrained Delaunay triangulation algorithm on the boundary and interior vertices to generate a 2D mesh within the profile curve, and displace the interior vertices in a direction normal to the profile curve plane.

5. The system of claim 1, wherein the silhouette defines a tubular shape.

6. The system of claim 5, wherein the computer processing unit and digital memory are further configured to detect when the user has drawn two rail curves defining a tubular profile shape and automatically fit a sweep geometry with a circular cross section between the two rail curves.

* * * * *